(12) United States Patent
Brader et al.

(10) Patent No.: US 12,271,358 B2
(45) Date of Patent: Apr. 8, 2025

(54) ANALYZING A DATABASE BY REPRESENTING DATABASE RECORDS IN A PROJECTION SPACE INFLUENCED BY FORCES

(71) Applicant: Quandris Inc., Snohomish, WA (US)

(72) Inventors: Lawrence Brader, Snohomish, WA (US); Christopher Charles Tavares, Bellevue, WA (US)

(73) Assignee: Quandris Inc., Snohomish, WA (US)

( * ) Notice: Subject to any disclaimer, the term of this patent is extended or adjusted under 35 U.S.C. 154(b) by 0 days.

(21) Appl. No.: 18/437,059

(22) Filed: Feb. 8, 2024

(65) Prior Publication Data

US 2024/0273056 A1 Aug. 15, 2024

Related U.S. Application Data

(60) Provisional application No. 63/484,412, filed on Feb. 10, 2023.

(51) Int. Cl.
*G06F 16/21* (2019.01)
*G06F 11/34* (2006.01)
*G06F 15/78* (2006.01)
*G06F 16/215* (2019.01)
*G06F 16/28* (2019.01)

(52) U.S. Cl.
CPC ........ *G06F 16/215* (2019.01); *G06F 11/3457* (2013.01); *G06F 15/7814* (2013.01); *G06F 16/285* (2019.01)

(58) Field of Classification Search
CPC ............. G06F 15/7814; G06F 11/3457; G06F 16/215; G06F 16/285
See application file for complete search history.

(56) References Cited

U.S. PATENT DOCUMENTS

2007/0233624 A1* 10/2007 Buscema ................. G06T 5/20
706/20
2013/0132480 A1* 5/2013 Tsuji ...................... G06Q 10/06
709/204

(Continued)

OTHER PUBLICATIONS

International Application No. PCT/US2024/015042—International Search Report and Written Opinion, mailed May 24, 2024, 14 pages.

*Primary Examiner* — Kris E Mackes
*Assistant Examiner* — Cecile H Vo
(74) *Attorney, Agent, or Firm* — Perkins Coie LLP

(57) ABSTRACT

The disclosed system obtains records from a database, determines weights associated with the records, and obtains a first and a second force acting on a record among the records. The system defines a projection space based on the records, represents the record in the projection space by projecting the record into the projection space to obtain a projected record, and represents the first force and the second force in the projection space. The system repeatedly applies the first force and the second force to the projected record, thereby changing a position of the projected record in the projection space, until an equilibrium between the first force and the second force is reached. The system determines how closely the value associated with the record satisfies the first value associated with the criterion based on a distance between the projected record in the projection space at equilibrium and the first force.

20 Claims, 22 Drawing Sheets

(56) References Cited

U.S. PATENT DOCUMENTS

| | | | |
|---|---|---|---|
| 2015/0254370 A1* | 9/2015 | Sexton | G16Z 99/00 707/798 |
| 2016/0085725 A1* | 3/2016 | Léonard | G06F 18/24137 702/189 |
| 2019/0370231 A1* | 12/2019 | Riggs | G06F 16/21 |

* cited by examiner

```
The following Grid definition is used for
Y - Axis   1180
         "naked_foal_syndrome": "string"

Values
         string   double   comment
         nfs/nfs  100      will die within 1 year
         n/nfs    50       has regressive NFS gene
         unknown  25       unknown - if both parents are n/n then the unknown can be set
                                    to n/n
         n/n      0        doesn't have regressive NFS gene X - Axis Potential Metric Axis - need a comparison for each 1110 ── "name": "string",
1120 ── "dam_id": "double",
1130 ── "sire_id": "double", 1140 ── "birth_location": "string", 1150 ── "sex": "string",
1160 ── "height": "double",
1170 ── "color": "string", "purebread": "string",
        "breed_type": "string",
        "other_breed": "string",
        "other_breed_name": "string", "birth_date": "date",
        "deceased_year": "date", "id": "double",
        "ataa_id": "string",
        "vniik_reg_number": "string",
```

*FIG. 11*

```
"name": "Animal Registry Name Calibration",
"id": "CB64991F-D5F7-4FF9-B0C3-97FFB3D0AFB3",
"retainVelocityAfterTick": false,
"metrics": [...],
"infoforms": {                                              ← 1200
  "Astrachan": {                                            ← 1210
    "position": [ 50.0, 20.0 ],                             ← 1220
    "color": "blue",                                        ← 1230
    "metrics": {
      "ataa_id": {
        "value": "1",
        "mass": 1.0
      },
      "birth_date": {                                       ← 1240
        "value": "12/9/1990",
        "mass": 1.0                                         ← 1250
      },
      "birth_location": {                                   ← 1260
        "value": "Denver",
        "mass": 1.0                                         ← 1270
      },
      "breed_type": {
        "value": "AkhalTeke",
        "mass": 1.0
      },
      "breeder_id": {
        "value": "57",
        "mass": 1.0
      },
      "horsecolor": {
        "value": "gold",
        "mass": 1.0
      },
      "created": {
        "value": "12/9/2019",
        "mass": 1.0
      },
```

*FIG. 12*

```
1300 ——  "forces": {
            "ForceAstrachan": {
              "type": "point",
1350 ——      "position": [ 10.0, 100.0 ],
              "innerRadius": 0.1,
              "outerRadius": 1000.0,
1320 ——      "k": 0.00001,
1340 ——      "powerSignature": -1,
              "color": "red",
              "metricDetails": {
                "name": {
                  "enabled": true,
1310 ——          "targetValue": "Astrachan",
                  "maxAffectedMass": 10.0,
1330 ——          "forceMass": 1000,
                },
              }
            }
1360 ——  "ForceNOTAstrachan": {
              "type": "point",
1370 ——      "position": [ 10.0, 0.0 ],
              "innerRadius": 0.1,
              "outerRadius": 1000.0,
              "k": 0.00001,
              "powerSignature": -1,
              "color": "black",
```

TotalMassHorse:
Mass: 20

1690

1610 hd_ataa_id: AAKTS0164
Mass: 1 hd_availability: Not For Sale
Mass: 1 hd_birth_date: 1151737200
Mass: 1 hd_birth_location: Blackmores
Mass: 1

1620 hd_breed_type:
Mass: 0 hd_breeder_id:
Mass: 0 hd_breeding_license_id:
Mass: 0 hd_color: Cremello
Mass: 1 hd_competition_record_ids:
Mass: 0 hd_competition_record_type:
Mass: 0

*FIG. 16A*

ANALYZING A DATABASE BY REPRESENTING DATABASE RECORDS IN A PROJECTION SPACE INFLUENCED BY FORCES

CROSS-REFERENCE TO RELATED APPLICATIONS

This application claims the benefit of and priority to the U.S. Provisional Patent Application No. 63/484,412, filed on Feb. 10, 2023, which is hereby incorporated by reference in its entirety.

BACKGROUND

The challenge faced by current binary-based processor architectures is to find the causality of a problem in order to build a solution. To determine these causalities requires identifying correlations from varied data sources, eliminating data quality issues, and applying spatial understanding. To work with these various correlations and measure a causality requires increasingly complex multivariant models. Even machine learning and other artificial intelligence (AI) approaches fail to solve some of these problems. This magnitude of complexity is not what today's processors were designed to solve.

BRIEF DESCRIPTION OF THE DRAWINGS

Detailed descriptions of implementations of the present invention will be described and explained through the use of the accompanying drawings.

FIG. 11 shows records in a database.

FIG. 12 shows relationship between InfoForms, metrics, and records.

FIG. 13 shows two forces that can be applied to projected records.

FIGS. 16A-16B show various records that can be used in the definition of a force.

Figure 1:
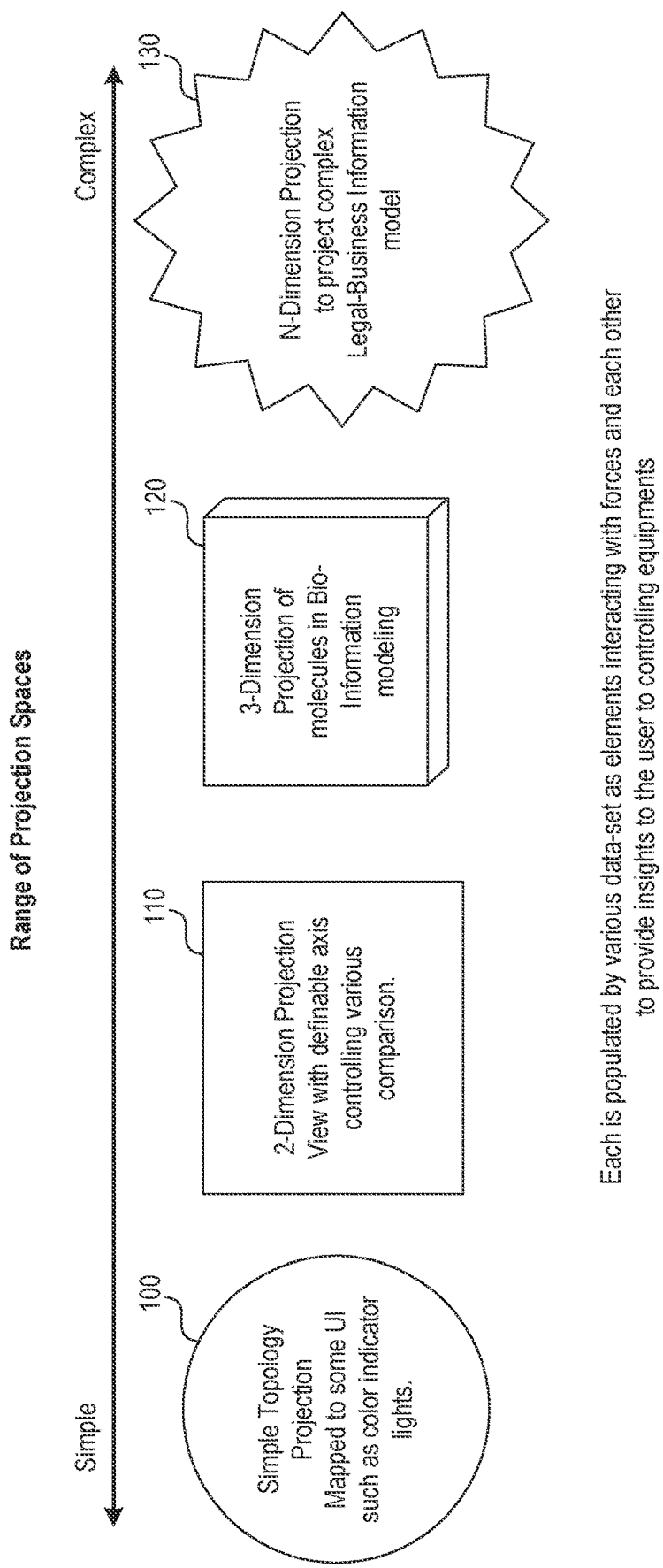
FIG. 1 shows how the geometry forming a space is dependent on the problem at hand.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Described here is a new processor operating within a GIPS. This new processor can be implemented in hardware, or can be implemented as a virtual machine (VM).

Instead of being binary-based, the processor base type is an expandable list of defined information types from simple to complex. These unique information base types are combined with a geometry to form a processor space. This allows for a wide range of operations not possible in a binary-based processor. An information type can be derived from any data source and integrated into the geometry. The spatial aspect of the GIPS allows the measurement of any effect on any of the data elements within the GIPS. The GIPS was designed to scale in order to handle complex multivariants with multiple variables to measure the potential causality based on any user or programmable correlations.

The processor has a base set of data types similar to how the binary type is used by a system based on a central processing unit (CPU). In the GIPS, the base data types are founded on metrics defined by arrays of different information forms that are bound to a unique geometry. In addition, the clock Tick( ) that forms the point where processing occurs is also the same in the GIPS, except it is a full spatial processing of data element interactions. Within the spatial processor the Tick( ) is isotemporal, meaning that processing occurs at the same time throughout the space. The clock Tick( ) defines a computation step.

In GIPS, the base types are formed by InfoForms, e.g. information forms, which are defined with metrics containing properties such as those found in database records or equivalent data sets. Other important metric properties are defined by their spatial locality and mass. These last two properties of an InfoForm provide a way to define how forces interact in the GIPS, which then allows measurement of interactions. These measurements are the key value to the GIPS processing approach. Forces in the GIPS are constructed by implementing rules or algorithms that affect various metrics. Today's CPUs are based on binary encoding and are inherently closed systems, while the GIPS is an open system, based on metrics binding with a geometry.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Structural Implementation Concepts

FIG. 1 shows how the geometry forming a space is dependent on the problem at hand. The processor can be thought of as a geometrical model of an interaction space that is populated with elements. Rules within the GIPS implement forces that control the interactions in a virtual world. The user interacts by controlling various forces via controls and watching the interactions in this virtual world. In one aspect, the processor has many components that are similar to today's video games. A gaming space projects a model of some world, populated with items to work with, virtual forms, and users interacting with this projected space.

This virtual world model for information processing is called the projection space. The type of geometry forming the projection space 100, 110, 120, 130 is dependent on the problem it is meant to solve.

An important aspect to achieve this information processing is that each projection space is isotemporal, meaning everything in the space is occurring at the same time. While not obvious, the reason to use an isotemporal information geometrical space is to provide a neutral reference background to decouple data sets to keep them from being locked into a single algorithm. The projection space 100, 110, 120, 130 provides a place to perform comparisons and other types of analysis of information forms.

The projection space 100 can be as simple as 1-D collection, 2-D 110 with an {x,y} axis, 3-D 120 supporting a full atomic model, or N-D 130. There is really no limit to the number of spatial projection dimensions except the cost of processing them and the limited usage above a higher dimension. In addition, the axis defining a projection space can change to allow different comparisons and relationships. For example, this can be seen when doing a Fourier Transformation, switching between a time axis and a frequency axis. Suffice it to say that the axis controlling the projection space allows the user various ways to construct and view several scenarios.

The objects populating a projection space are called InfoForms, which are created upon ingestion of datums from various data sets. When a datum is ingested, the name-values of that data set become metrics to identify the InfoForm in the projection space. The term "metric" is used throughout the GIPS description, and it refers to any quantifiable (meaning it has a measurable quality) attribute of the name-value pair that comprises a data set. These metrics are also how forces interact with this projected datum in the projection space. InfoForms can be just data type and agent type. They also can be combined to form more complex entities. The complete list of functions provided by an InfoForm wrapper is as follows:

| Wrapper (API) | Function | Used By |
| --- | --- | --- |
| Metrics | The identity of a list of [name, value] pairs | Data & Agent |
| Location | The location in a projection space | Data & Agent |
| Shape | The manifestation in a projection space | Data & Agent |
| Movement | The movement in a projection space | Data & Agent |
| Cluster | Connected InfoForms | Data & Agent |

-continued

| Wrapper (API) | Function | Used By |
| --- | --- | --- |
| Force Input | Functions to handle force inputs | Data & Agent |
| Force Output | Functions to apply a force | Agent |

Each projection space 100, 110, 120, 130 is formed by the Codex that defines how geometries bind with an information model composed of metrics from the information physics. The Codex can create a manifold which forms the projection space. The terms come from the field of differential geometry with input from information theory.

The Codex is formed by the relationships in two tables, one that defines the shape of the geometry and forces, and the other that shows how information binds with forces forming the interactions. They are called the Basis table and the Metrics table and are defined below.

The Basis table defines the projection space geometry. It is composed of two types of interacting dimensions, the spatial dimensions and the force dimensions.

Spatial dimensions: In a projection space, the spatial dimensions define the virtual space where the InfoForms interact based on influence from the force dimensions.

Force dimensions: In a projection space, the force dimensions transmit forces affecting metrics and can be controlling globally or localized to specific InfoForms. These allow the user to control the projection space.

Tables define how the forces interact with the geometries.

Figure 2:
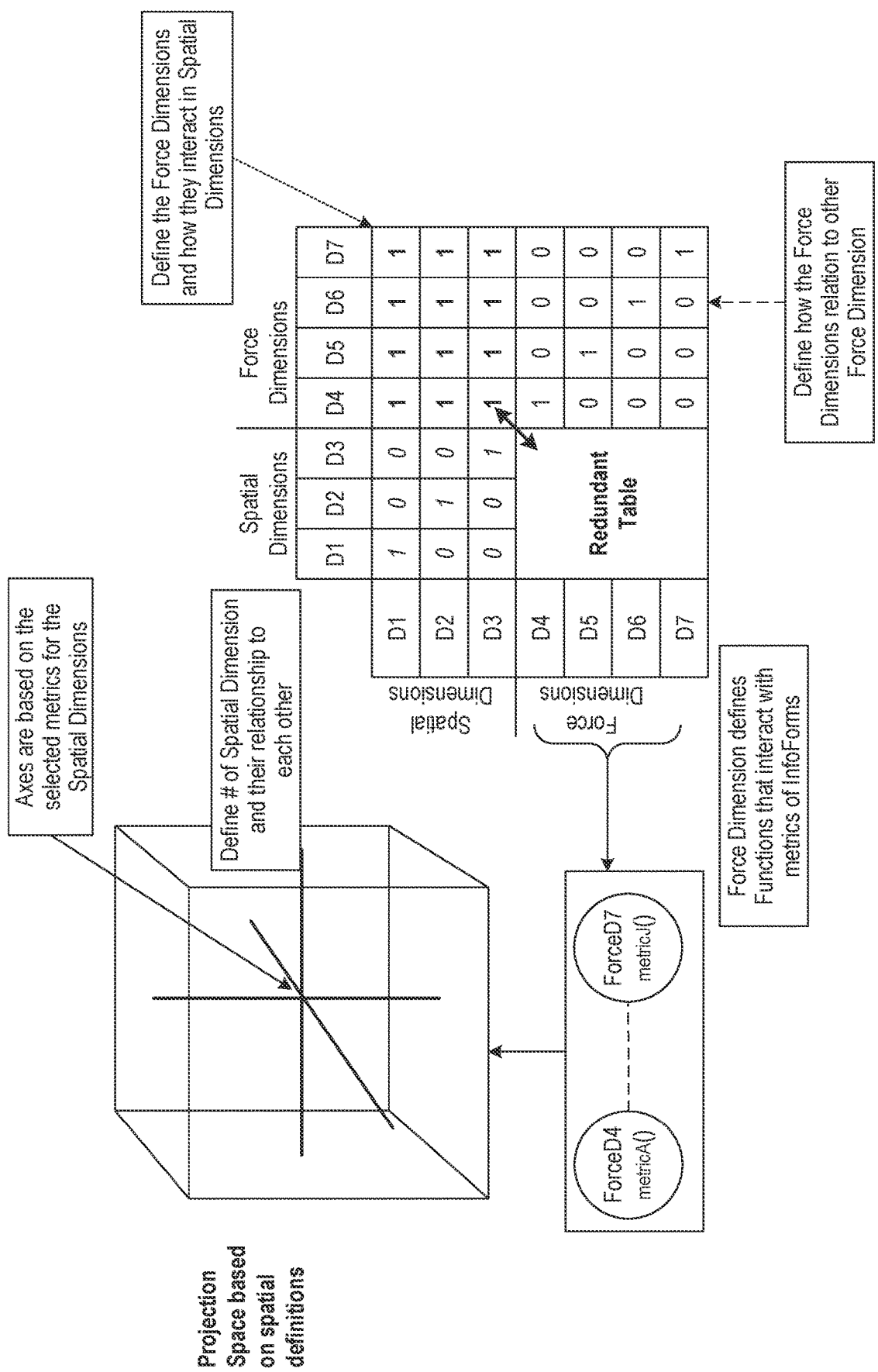
FIG. 2 shows the relationship between the table parts and the formation of a projection space.

FIG. 2 shows the relationship between the table parts and the formation of a projection space. The next table forming the Codex is the Metrics table. The Metrics table maps metrics to the spatial and force dimensions:

A metric is a name-value pair. The table has all the metrics of interest.

Metrics are part of each InfoForm, data, and object populating the space.

The metrics mapped to spatial dimensions can control the shape of that InfoForm projection.

The metrics mapped to force dimensions can be controlled by those forces.

Figure 3:
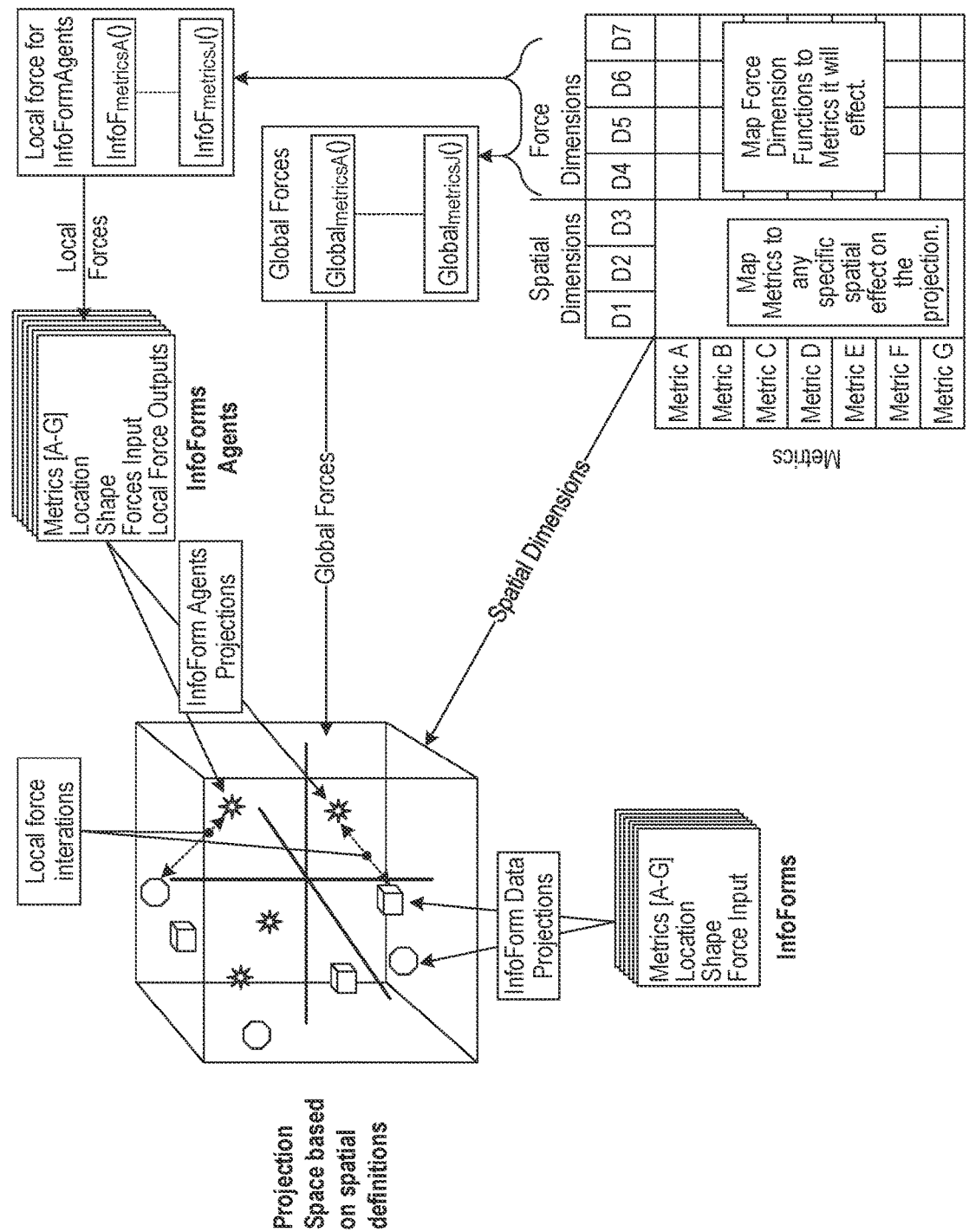
FIG. 3 shows the relationship of the Metrics table to a projection space.

FIG. 3 shows the relationship of the Metrics table to a projection space. Business model data sets, comprised of metrics, are ingested and map to InfoForms within the projection space. The business model also defines the metrics that we are interested in and model rules are used to define spatial and force dimensions. The Codex uses these definitions to form the Basis and Metrics tables. The Codex also manages the projection space control of forces and information forms via interactions with the user.

GIPS Operational Description Section

The following description decomposes the GIPS into several operational flowcharts that form an implementation for a digital computer architecture framework. This section details the operations sections to form a GIPS. As shown, the GIPS is a construct that allows information processing data in a projection space model based on information physics. The model is formed by an information-based geometry space that supports an information-based set of forces that controls the interactions of InfoForms and data as shown in the previous section. All ingested data becomes an InfoForm with an underlying geometrical basis allowing it to interact with this space. The concept of all data having an intrinsic information geometry nature is obvious for specific models where geometries make sense, such as physical locations on a map. Generalizing that all data has an intrinsic geometrical nature is not obvious.

Note that this decomposition reflects the major software operations expected to take place, while accurate implementation of these systems may vary depending on the selected language, platform, and efficiency.

Figure 4:
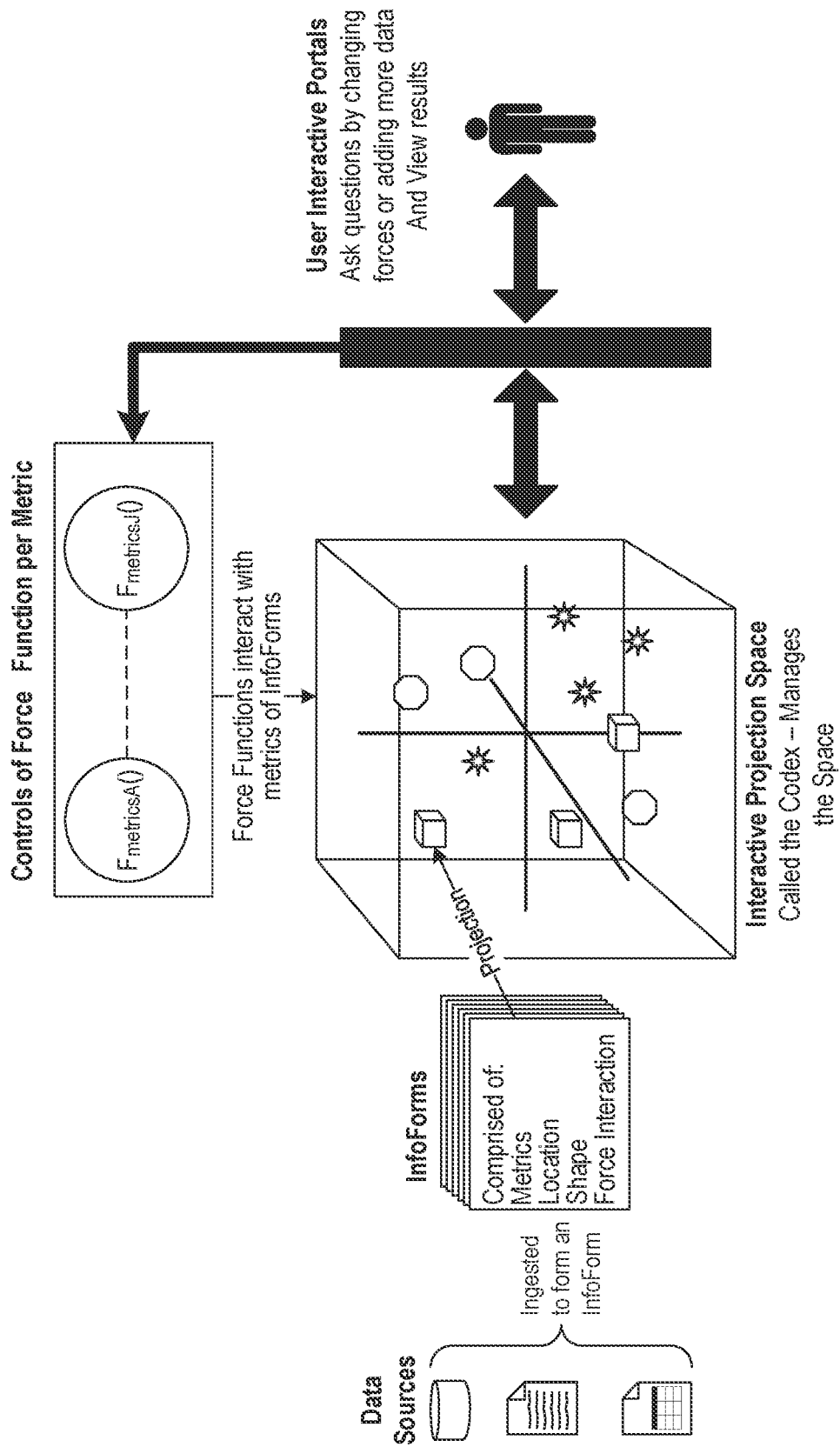
FIG. 4 shows a high-level view of the operational components forming a Geometrical Information Processor Space (GIPS).

FIG. 4 shows a high-level view of the operational components forming a GIPS. The main purpose of the GIPS is the formation and operation of the projection space, which is where the geometrical-based information processing and visualization occurs.

The following table lists and describes each of these areas:

| # | Component Name | Description |
|---|---|---|
| 1. | Ingestion of Data to InfoForms | Process of ingesting various data sources into InfoForms that can be projected into the projection space for processing. |
| 2. | InfoForms | There are three basic types of InfoForms: data that is immutable, clusters of data forming more complex InfoForms, and agents manipulating local forces. |
| 3. | Projection Space | The interaction space where InfoForms, global forces, and local forces occur and are measured by the user. |
| 4. | Codex | Creates and operates the MIPS, based on the Basis and Metrics tables. |
| 5. | Forces | Global forces affect the complete space and localized forces affect a selected area or selected InfoForm. |
| 6. | User Interaction View Portal | Provides the interface to control InfoForms and forces to manipulate the projection space. |

Figure 5:
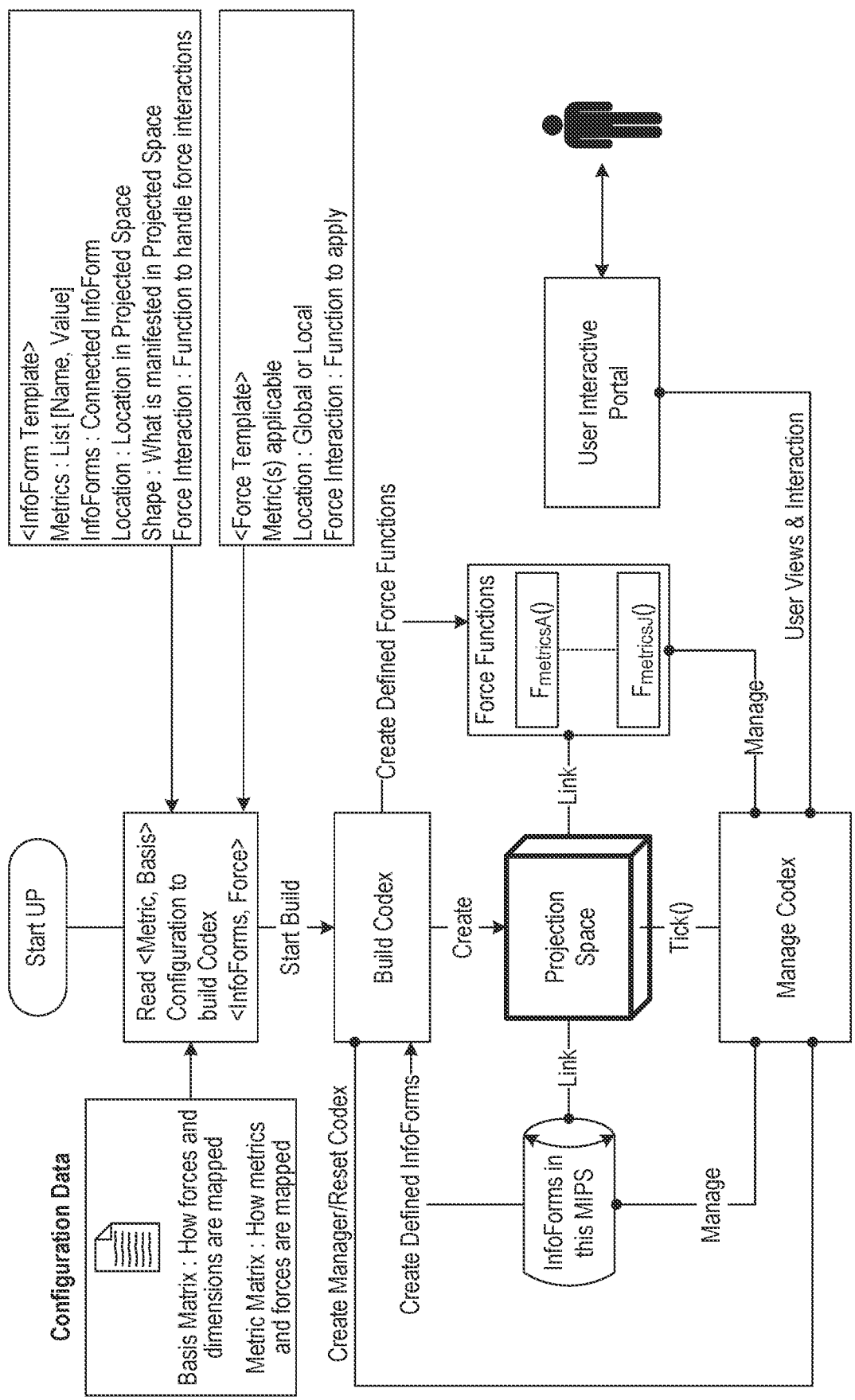
FIG. 5 shows an operation flowchart depicting the Codex, which is the manager of Microprocessor without Interlocked Pipelined Stages (MIPS).

FIG. 5 shows an operation flowchart depicting the Codex, which is the manager of the MIPS. As mentioned, the main goal is to form and operate the information physics and forms in a projected space. The Codex major operations are:

Create and operate a projection space based on configuration data settings.

Ingest data from various sources and map them to information forms via the InfoForm template.

Create and register global force functions to control information in the projection space.

Move InfoForms based on their interactions with global and local forces for each Tick( )—a time tick event is when something occurs.

Provide users an interface to manipulate and view the projection space.

Figure 6:
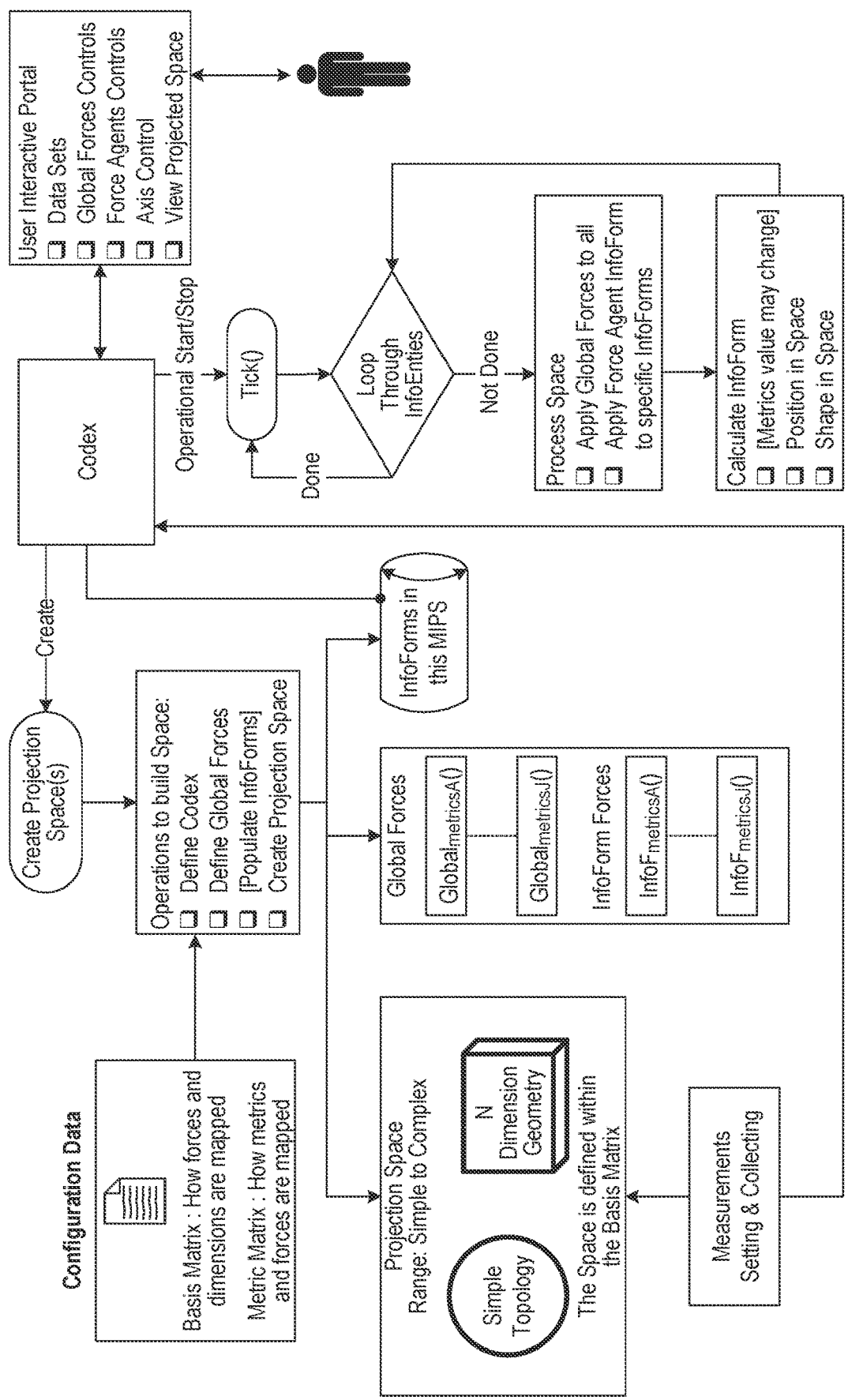
FIG. 6 shows the operations that occur within a projection space.

FIG. 6 shows the operations that occur within a projection space. A projection space is an information-based topology; it can display very simple or very complex geometries. The Basis table defines this geometry and has two types of dimensions, spatial and force dimensions. The spatial dimension is an actual space where data is projected as InfoForms.

The projection of the InfoForms can change depending on the selected spatial axis the user selects to observe. How InfoForms move, collect, repel, and interact can be measured.

InfoForms will be described in more detail later, but it is worth pointing out that InfoForms can combine to form more complex cluster InfoForms.

All of these different types of InfoForms will react to forces. There are two types of forces: global forces affect the complete space, and local forces can be limited to specific areas or specific InfoForms. Think of the local forces as InfoForm Agents that can move around and manipulate InfoForms or even other Agents.

The user can control the forces to manipulate the data, change the projection axis, and observe the results of the projected space.

Figure 7:
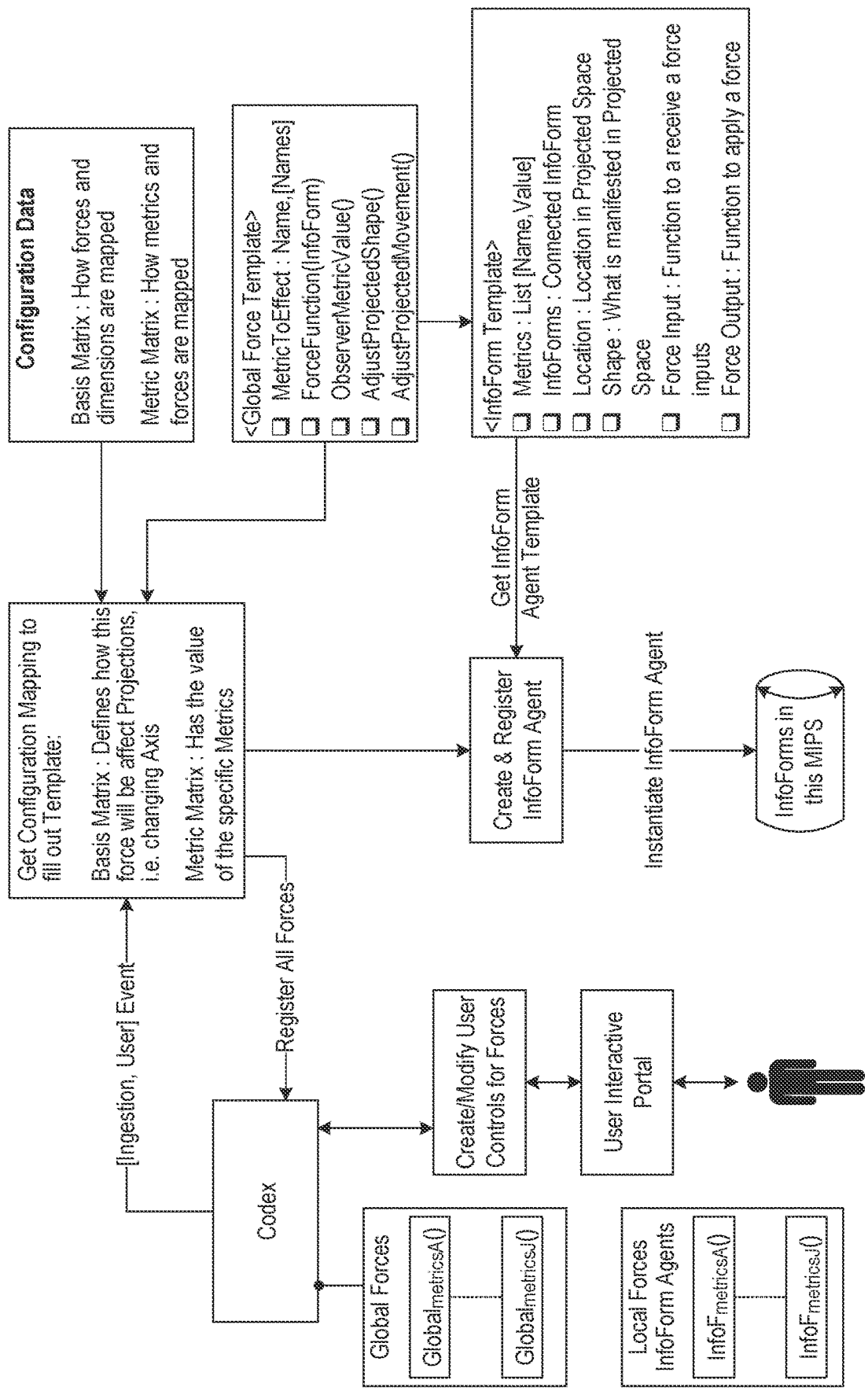
FIG. 7 shows a flowchart for creating force functions.
Figure 8:
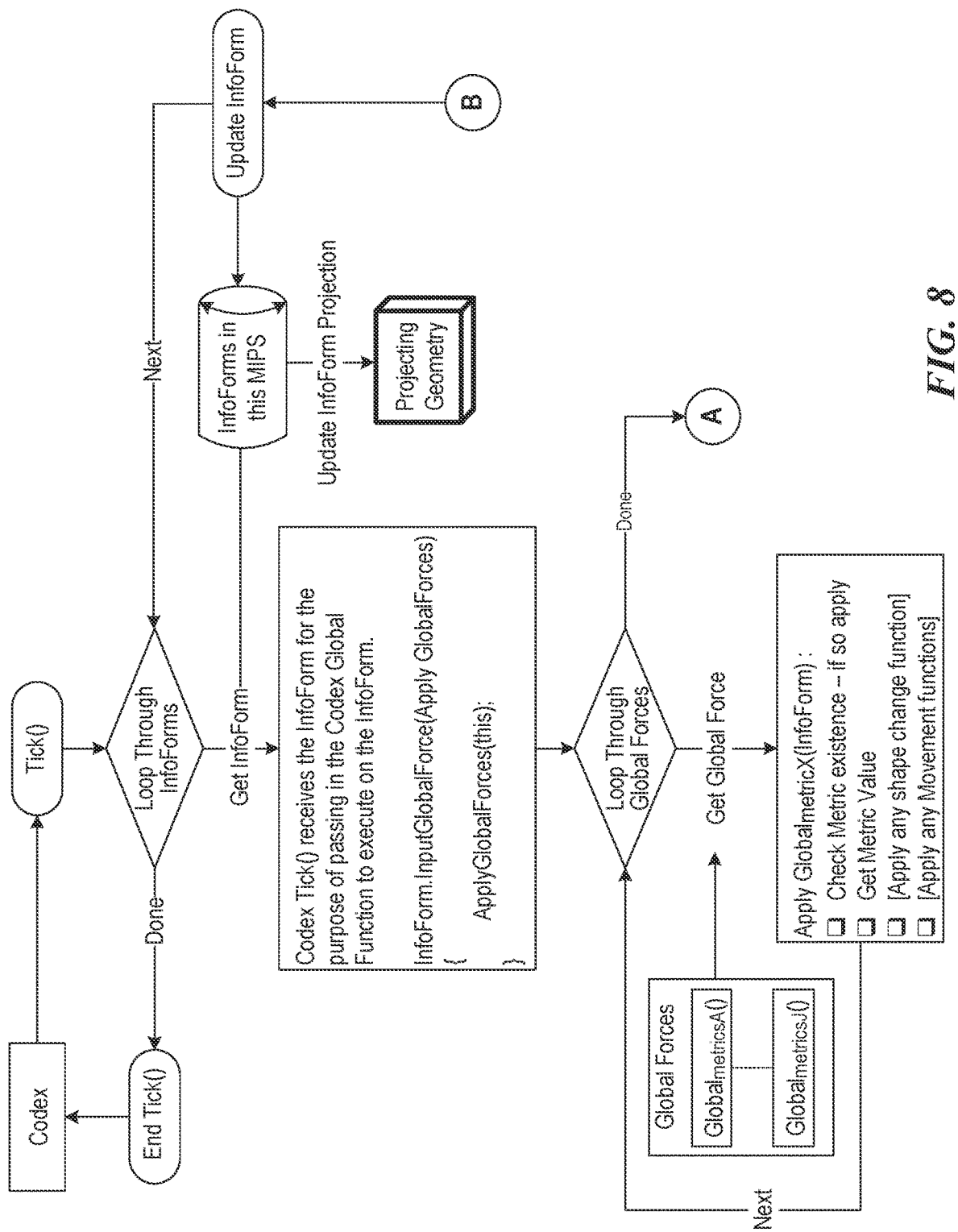
FIG. 8 shows a flowchart of the force functions operations.
Figure 8:
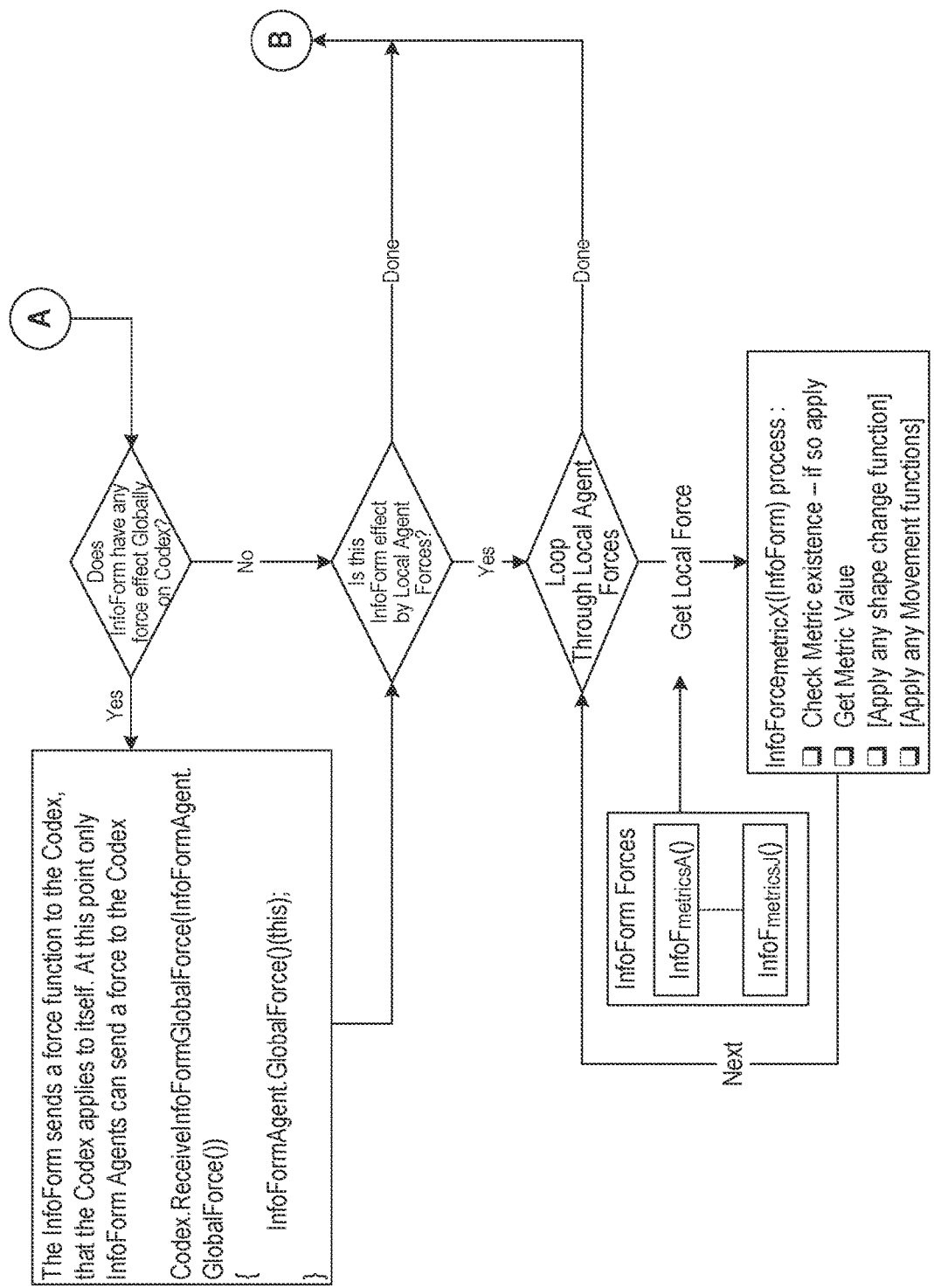

FIGS. 7-8 describe operation flowcharts showing how forces are created and their operations. This is the starting point to build a Codex and the required interactions. Both the Basis and Metrics tables have force dimensions that are derived from the business rules.

FIG. 7 shows a flowchart for creating force functions. The first step is to construct the Basis and Metrics tables to form a Codex. These tables are built based on what the user wants to observe and control. Forces in this model are essentially the same concept as rules.

The Basis table defines the projection space where the interaction will occur and the forces that define how those interactions will occur from a global point of view. They can be found in the user model as rules.

The Metrics table is formed by identifying the metrics from the model's various data sets. Specifically, the metrics are the name-value pair found in a data set that the user is interested in. During interactive operations, the user can turn these metrics on and off in the interactions.

FIG. 8 shows a flowchart of the force functions operations. The flowchart illustrates how forces are applied by detailing the world clock Tick( ), where all the interactions for each InfoForm are resolved in the model.

Figure 9:
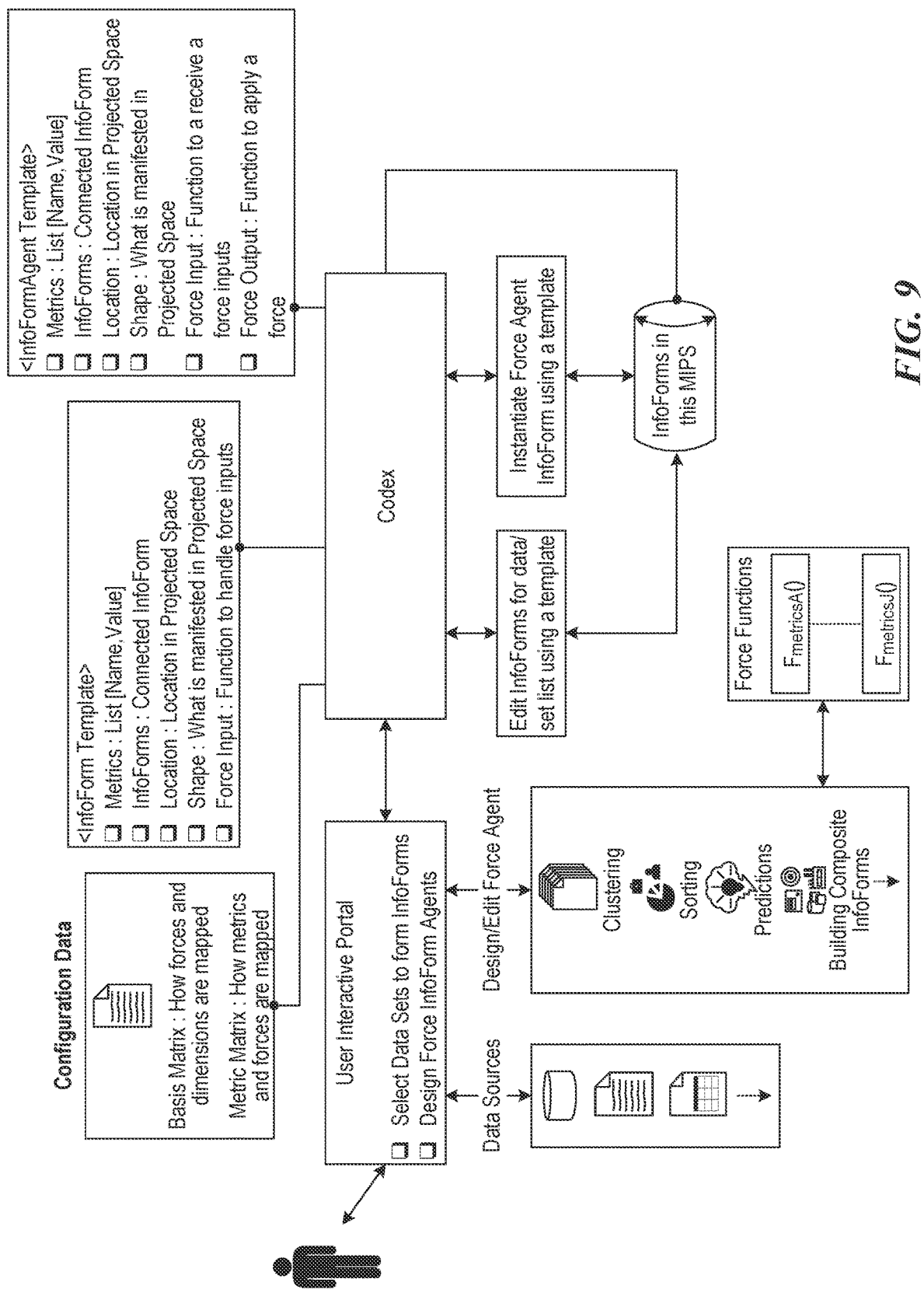
FIG. 9 shows an operation flowchart of information forms (InfoForms).

FIG. 9 shows an operation flowchart of InfoForms. The operation flowchart illustrates the construction of InfoForms, data, and InfoForm Agents. The templates for each reflect the required interfaces to operate in the projection space.

The differences between these two basic types of InfoForms are as follows:

InfoForms are data and the values are immutable.

InfoForm Agents are active elements in the projection space and can manipulate forces locally. They have all the characteristics of InfoForms with the added capability to apply a force.

InfoForm Agents interact with the projection space and can produce forces to manipulate the InfoForms or interact with other InfoForm Agents.

Figure 10:
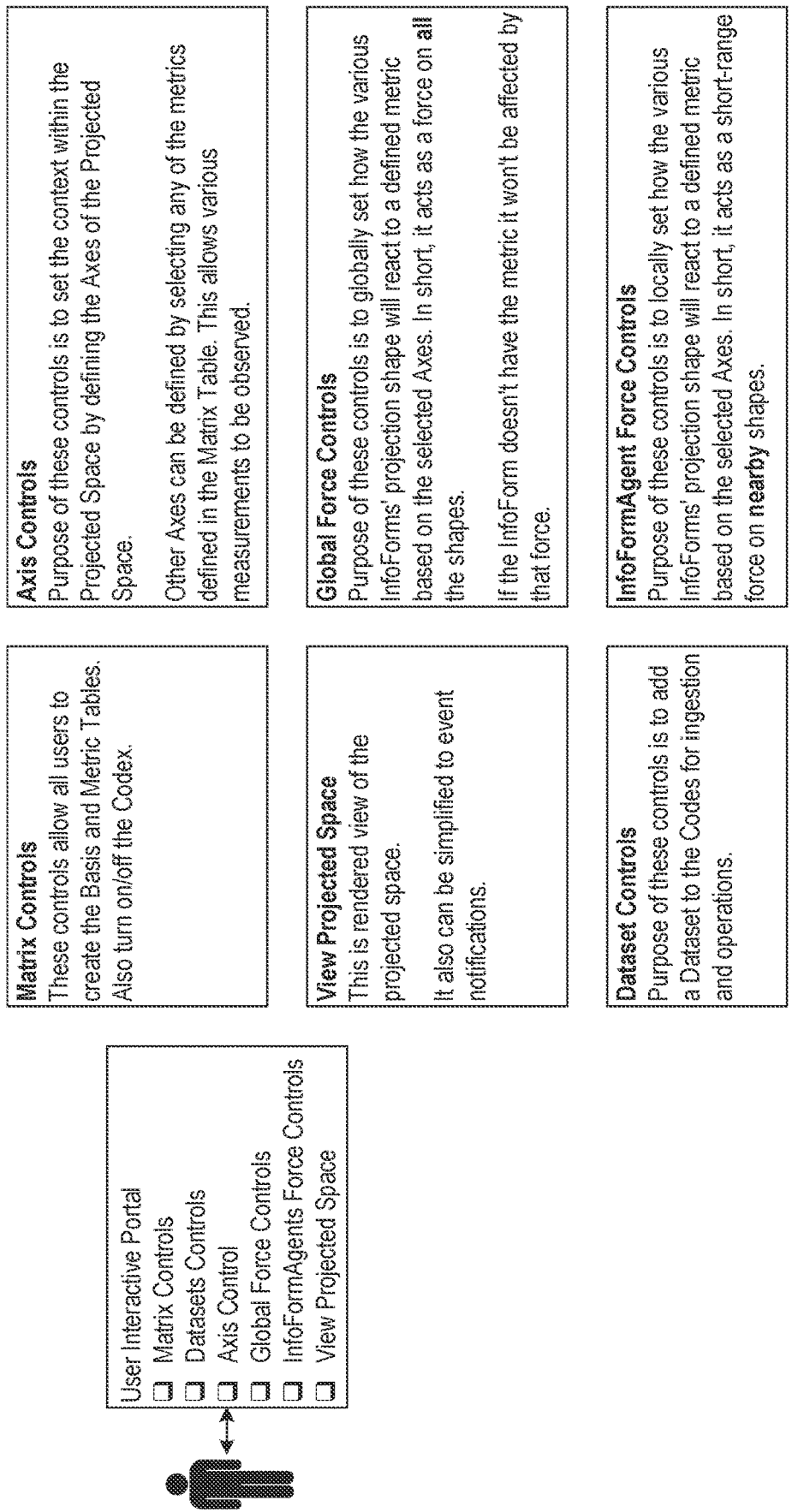
FIG. 10 shows operations of the user interactive view portal, namely the operations the user can perform with the GIPS.

FIG. 10 shows operations of the user interactive view portal, namely the operations the user can perform with the MIPS.

Example Applications

FIG. 11 shows records in a database 1100. The disclosed system can take multiple databases, and using forces, as described herein, can determine whether records in the multiple databases should be combined, can determine correlation between various records in the various databases, and can provide answers to various queries presented in terms of forces. For example, the multiple databases can be the data sources in FIG. 3. The system does not form database queries, such as SQL queries, and instead computes forces acting on records projected into a projection space. The answer to the query is determined as a distance between the force and the projected record, when the projected record reaches an equilibrium. GIPS has the ability to measure the specified effect via forces that allow us to form correlations.

In one embodiment, the multiple databases can be three or more databases describing horses, people, devices, etc. For example, the first database can include horse information such as name 1110, dam identifier (ID) 1120, sire ID 1130, birth location 1140, sex 1150, height 1160, color 1170, etc. as shown in FIG. 11. The second database can include horse's name 1110 and the horse's blood type. The third database can include the horse's name 1110 and a gene 1180.

The gene can be naked foal syndrome (NFS). The gene can take on one of four states including unknown, gene is not present, gene is present, or gene carrier. The unknown state indicates that whether the NFS gene is present in the horse is not known. Gene is not present indicates that the horse does not have the NFS gene. Gene is present indicates that the horse has the NFS gene, and will likely die within one year of birth. Gene carrier indicates that the horse carries the NFS gene, but because the gene is recessive, the horse does not express the gene.

The disclosed system can determine correspondence between records in the various databases, thus creating a single database containing information from the disparate databases. The system can determine correlation between the various records and the presence of the NFS gene. To determine the correlation, the system can obtain a correlation force measuring correlation between various variables, as further described in this application.

For example, the system can determine whether there is a high correlation between the color of the horse and the presence of the NFS gene. Specifically, metallic color of the horse can be positively correlated to the presence of the NFS gene. Similarly, particular horse owners may have more horses that have the NFS gene. Consequently, if the status, e.g. value, of the NFS gene for a particular horse is unknown, the system can determine the likely value of the NFS gene by looking at one or more other attributes of the horse, such as the color of the horse, the gene values of the horse's sire and dam, the owner of the horse, etc. Based on the likelihood that the horse has the NFS gene or is a carrier, the system can automatically make recommendations as to whether to import the horse's semen, whether to purchase the horse, whether to use the horse as a sire or a dam, etc.

FIG. 12 shows the relationship between InfoForms, metrics, and records. An InfoForm 1200 can include identifier 1210 of the horse, e.g., horse's name, such as "Astrachan," initial position 1220 in the projection space, as described herein, color 1230 of the projected record, and multiple metrics 1240, 1250 (only two labeled for brevity).

The metric 1240, 1250 can be a record that includes a name-value pair. The record 1240 can include the name-value pair of "name," "Astrachan." The record 1240 includes the name-value pair of "birth date," "Dec. 9, 1990." The record 1250 includes the name-value pair of "birth location," "Denver." In addition, the metric 1240, 1250 can include a mass (e.g., weight) 1260, 1270 that indicates how the mass interacts with a force. The record can be obtained from external databases, while the disclosed technology appends the mass 1260, 1270 to each record.

For example, if the record has a value, the system can assign the mass of 1, while the system can assign the mass of 0 if the record does not have a value. The weight contributes to the force based on the following equation:

$$\text{force} = K * InfoC * (informationMassForce * InformationMassData)/(\text{distance})^{powerSignature}, \quad (1)$$

K, informationMassForce, and powerSignature are defined as a property of a force, as described below. InformationMassData is the mass 1260, 1270, and distance is the distance between the force and the mass in the projection space, as described below.

In the above equation, informationMassForce, or InfoForce, is an information force in a GIPS, which is equivalent to a physics force. In physics, force is measured in newtons with the dimensions defined as:

$$[\text{Mass}]*[\text{Length}]/[\text{Time}^2]$$

In the virtual nature of the GIPS, where force is based off of Information Comparison, the Force can be measured in InfoNewtons with the dimensions defined as:

$$[\text{InfoMass}]*[\text{Length}]/[\text{Time}^2]$$

K is the energy density of a defined InfoForce. K can only affect that InfoForce. A system can include hundreds of K, each K corresponding to an InfoForce. K can control how different InfoForces can interact. K dimensions are defined as:

$$[\text{InfoMass}]*[\text{Length}^3]/[\text{Time}^2]$$

InfoC is the Information Comparison value that is calculated based on the designated information the user selected to define for this InfoForce. InfoC adds the dimensionality of [Information] to InfoNewton.

In equation (1), informationMassForce, or Mass_force, is the Information Force Mass. InformationMassData, or Mass_form, is the Information Form Mass, also called InfoForms. InfoForms are the data ingested from various sources within the GIPS.

FIG. 13 shows two forces that can be applied to projected records. The force 1300 can define a first criterion 1310 to be satisfied by the record, where the first criterion includes a first value, e.g., a desired value, to be satisfied by the record. As shown in FIG. 13, the first criterion 1310 can indicate that the identifier, e.g., name, of the horse is "Astrachan." The force 1300 also includes K 1320, informationMassForce 1330, and powerSignature 1340 to be used in equation (1). The intensity exerted by the first force on the record is based on the weight associated with the record and how closely the value associated with the record satisfies the first value associated with the criterion. The force 1300 also includes the position 1350, which is the projection of the force 1300 along a force dimension in the projection space, as shown in FIGS. 14-15.

The force 1360 defines a second criterion to be satisfied by the record, where the second criterion is different from the first criterion. The second criterion can be opposite of the first criterion, such as indicating that none of the letters in the horse's name are the same as their corresponding letter in the word "Astrachan." The corresponding letter can be based on position, so, for example, if the horse's name is "Apple," the similarity to Astrachan is in the first letter, and none of the other letters, and the horse named Apple would not be opposite of Astrachan. The force 1360 also includes the position 1370, which is the projection of the force 1360 along a force dimension in the projection space, as shown in FIGS. 14-15.

Figure 14:
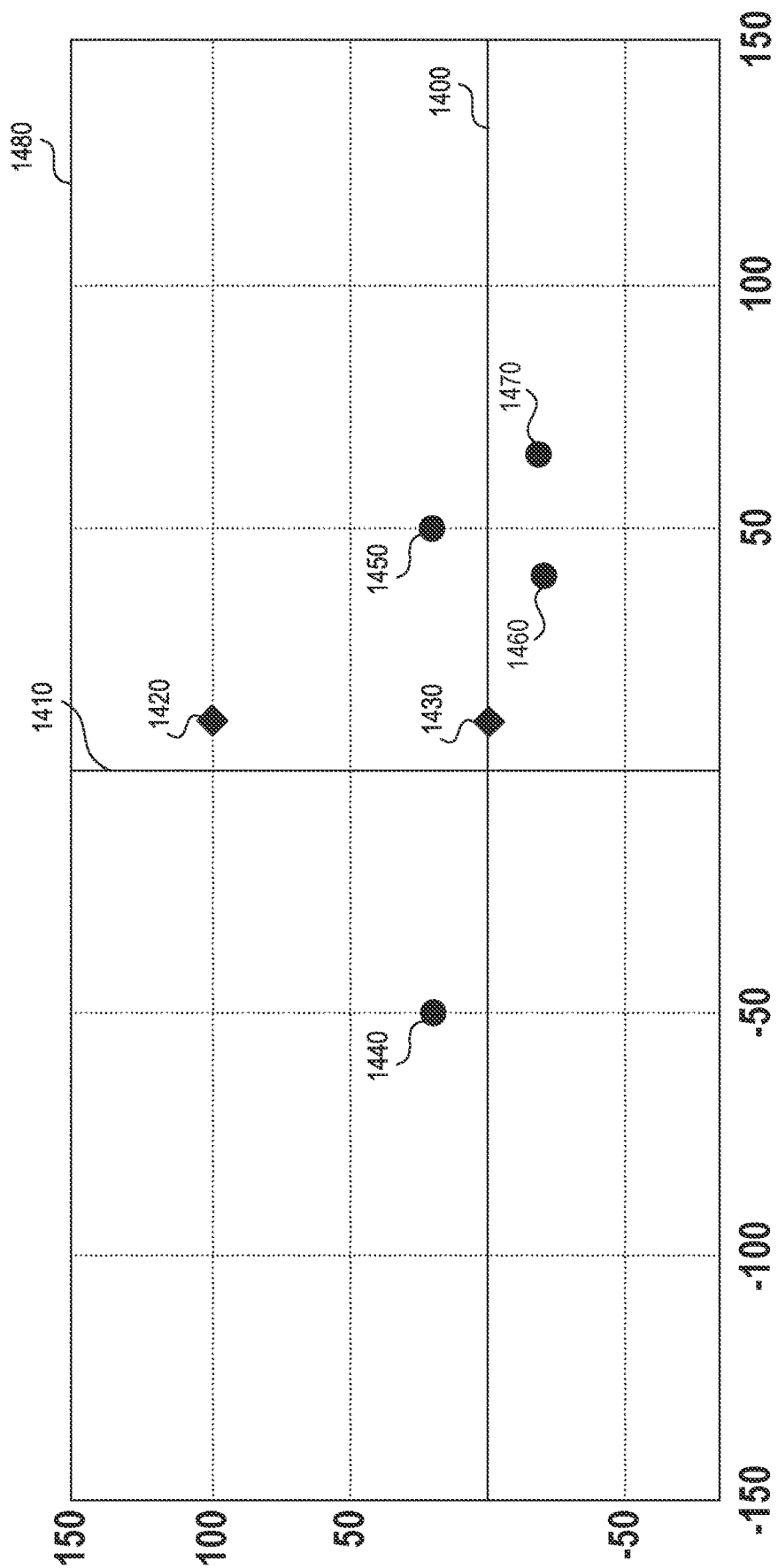
FIGS. 14-15 show the starting point associated with forces and information forms in the projection space, and the ending point associated with forces and information forms in the projection space, respectively.
Figure 15:
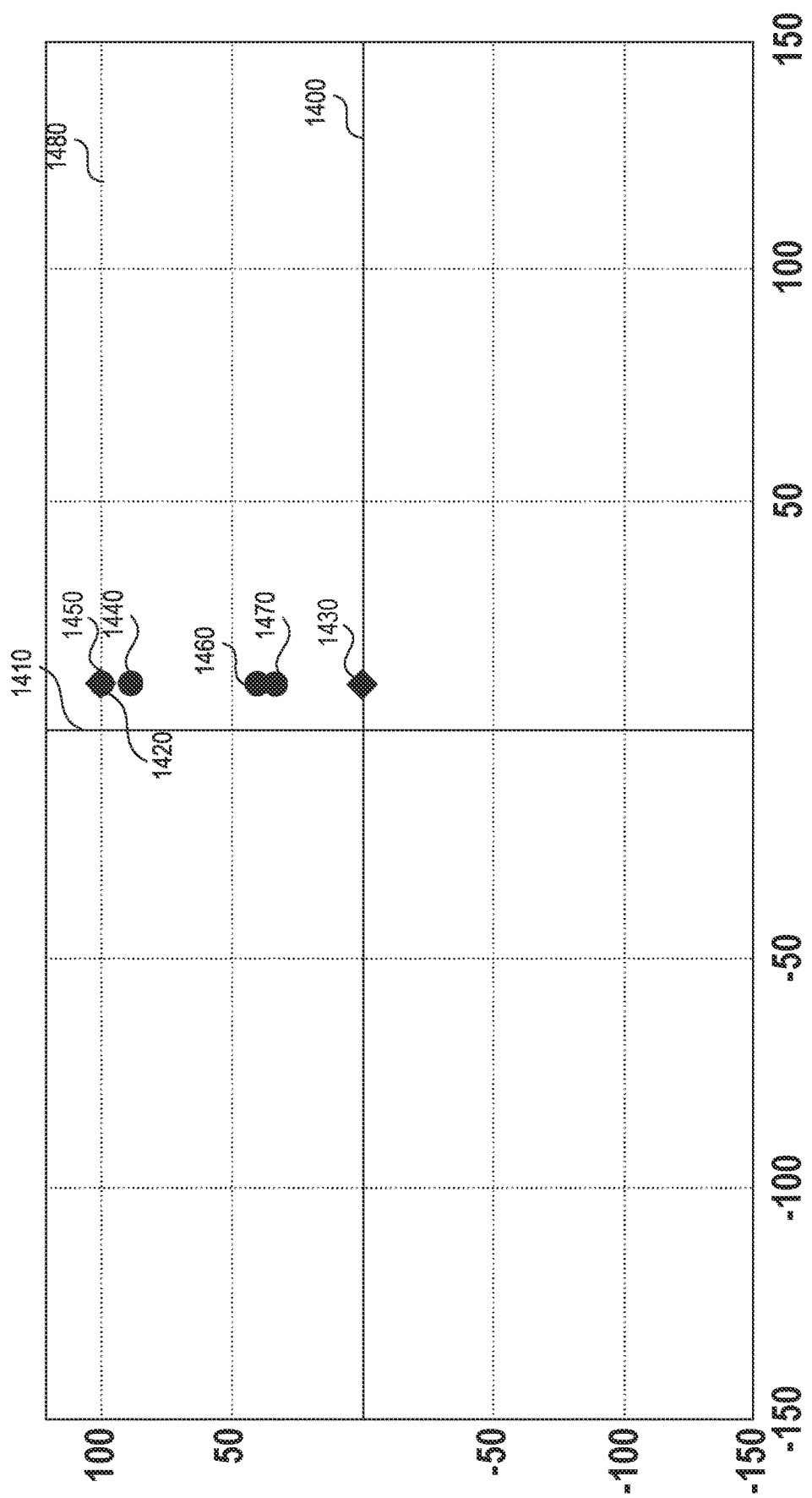

FIGS. 14-15 show the starting point associated with forces and information forms in the projection space, and the ending point associated with forces and information forms in the projection space, respectively. The X-axis 1400 can represent the identifier, e.g., name of the horse. The Y-axis 1410 can represent the force dimension. Forces 1420, 1430 attract information forms 1440, 1450, 1460, 1470 according to formula (1).

The intensity exerted by the force 1420 depends on how similar the name of the information form 1440, 1450, 1460, 1470 is to the name "Astrachan." In other words, the more similar the name of the horse represented by information form 1440, 1450, 1460, 1470 to "Astrachan," the stronger the attraction of the force 1420. In this case, the information form 1440, 1450, 1460, 1470 can correspond to a record referring to the name of the horse. The force 1430 is the opposite of the force 1420, and depends on how dissimilar the name of the information form 1440, 1450, 1460, 1470 is to the name "Astrachan." In other words, the more dissimilar the name of the horse represented by information form 1440, 1450, 1460, 1470 to "Astrachan," the stronger the attraction of the force 1420. The similarity of the strings can be measured by the number of same letters in the same positions in the two strings.

FIG. 14 shows the initial projection of the information forms 1440, 1450, 1460, 1470 on the projection space 1480 before the forces 1420, 1430 exerted their influence on the information forms. Information form 1440 represents horse name "Astrakhan," information form 1450 represents horse name "Astrachan," information form 1460 represents horse name "Henrchanse," and information form 1470 represents horse name "ZugChan." The forces 1420, 1430 are applied to the information forms in incremental steps, also known as ticks, until an equilibrium between the forces 1420, 1430 is reached, and the force exerted on each information form 1440, 1450, 1460, 1470 is below a predetermined threshold, such as 0.1.

Each tick can be thought of as a time step in a simulation of forces 1420, 1430. During each tick, one or more forces can be applied to the information forms 1440, 1450, 1460, 1470. For example, in a simulation, a hundred or a thousand different forces can act on an information form 1440, 1450, 1460, 1470. The information forms 1440, 1450, 1460, 1470 can be projected in a multidimensional projection space 1480. Each force does not have to affect each information form. For example, one force can affect five information forms, and another force can affect 18 information forms.

FIG. 15 shows the equilibrium reached after multiple ticks. As can be seen in FIG. 15, the information form 1450 that exactly matches the name "Astrachan" is at the same position as the force 1420. The information form 1440 that is the second closest match is in the second closest position to the force 1420. Information forms 1460 and 1470 are closer to the force 1430 than to the force 1420. In effect, the location of the information form 1440, 1450, 1460, 1470 between the forces 1420, 1430 indicates the similarity of the information form name to the desired identifier, in this case "Astrachan."

In addition, the distance between the information forms can indicate the similarity between the information forms themselves. For example, if the information forms were being attracted to the forces based on a value such as a name, or other value, the closer the information forms are to each other, the more similar the values of the information forms. Using the described method, similar records in two different databases that need to be merged can be identified. Similar records can appear close together in the projection space, as shown in FIG. 15.

For example, two different databases need to be merged where the two different databases have some of the same records. In one database, a record can be entered under the name Samantha, while in the other database the record can be entered under the name Sam. Using the described method, attracting the information forms based on the name, the two information forms, Samantha and Sam, will be close to each other in the projection space. The system can determine whether two information forms are within a predetermined threshold of each other, such as 20% of the distance between the two forces 1420, 1430, and can determine that the two information forms refer to the same record. In fact, the described method can provide an efficient way to merge two databases by quickly identifying identical records through force simulation.

Figure 16B:
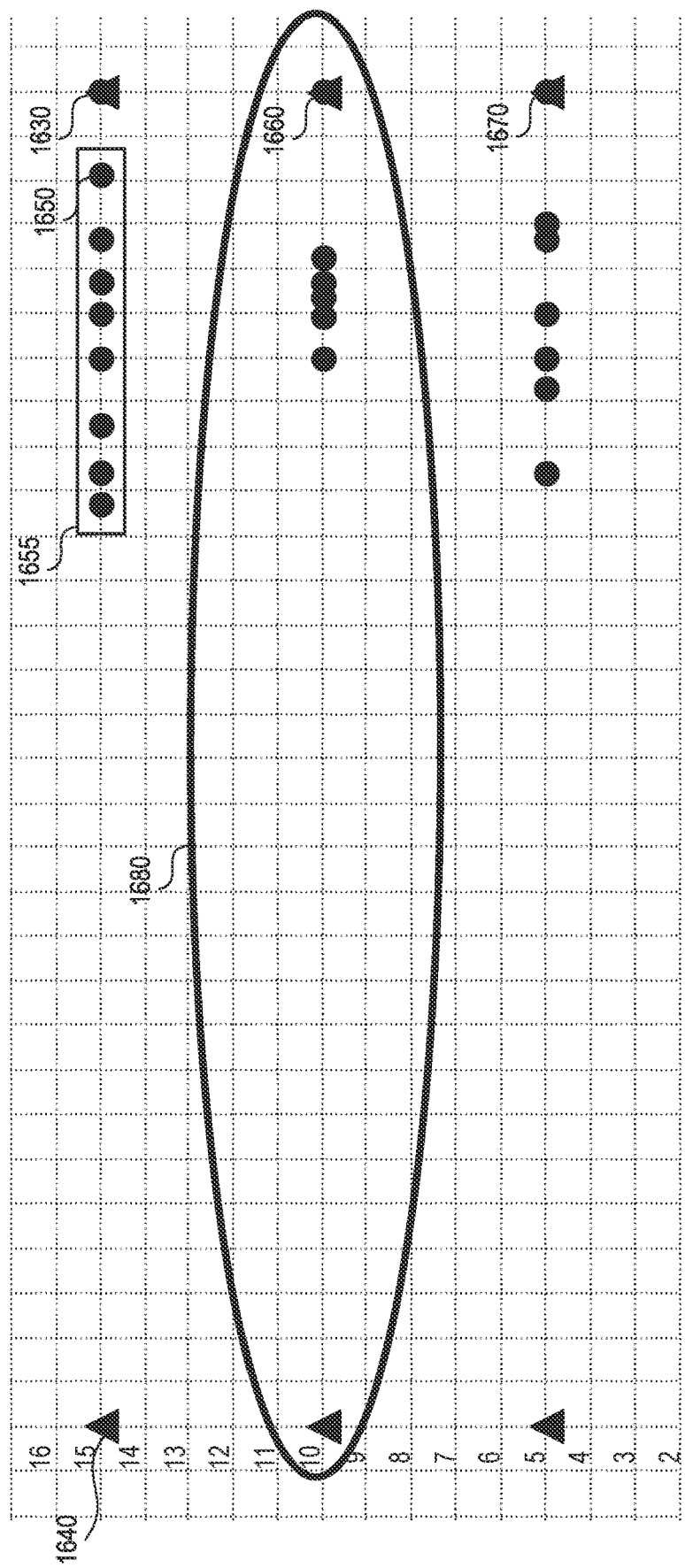

FIGS. 16A-16B show various records that can be used in the definition of a force. A force, as described in this application, can act on an information form containing a single record, including a name-value pair, such as the name of a horse. However, the force can act on an information form containing a combination of records such as the total mass 1600. The total mass 1600 can be a sum of masses 1610, 1620 (only two labeled for brevity) assigned to each record. A record can get a mass of 1 if it has a valid entry and a mass of 0 if it has no entry or an invalid entry. A force 1630 can be defined to attract the highest mass, while the other force 1640 can be defined to attract the lowest mass. Consequently, the records can spread between two forces 1630, 1640, indicating which records have the highest mass. The record 1650 closest to the force 1630 attracting the highest mass has the highest mass out of all the records 1655.

Forces 1630, 1640 can be defined based on the type of records that they act on. Forces 1660, 1670 (only two labeled for brevity) can act on records such as numerical records, string records, date records, time records, genetic records, etc. In addition, forces 1660, 1670 also act on an information form including a combination of records, such as a combination of numerical and string records. In other words, each information form 1650 (only one labeled for brevity) can be a combination of multiple records in one database. For example, record 1690 can indicate a gene. The forces 1660, 1670 can combine attraction both for the total mass 1600, which is a numerical record, and for a particular gene in the record 1690, which is a string.

The forces 1630, 1640, 1660, 1670 can have a defined region 1680 (only one labeled for brevity) of influence. The region 1680 can be circular, elliptical, rectangular, triangular, or any predetermined shape. If the information form is outside of the region of influence, the force 1630, 1640, 1660, 1670 does not act on the information form.

Figure 17:
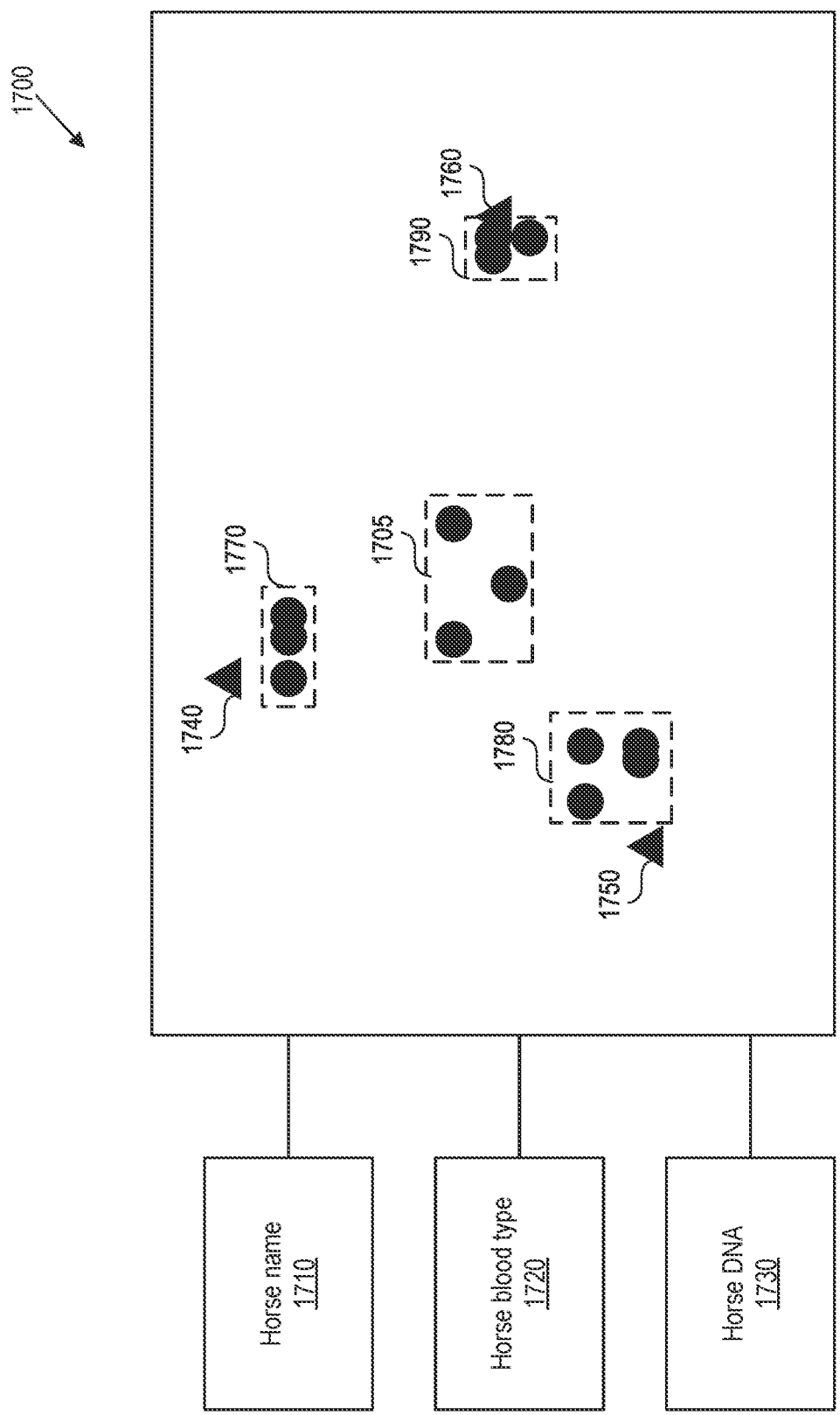
FIG. 17 shows use of the forces to map records between disparate databases.

FIG. 17 shows use of the forces to map records between disparate databases. The system 1700 can receive records from different databases such as a database 1710 including horse names, database 1720 including horse blood types, and database 1730 including horse DNA. Each database can include overlapping records about the same horses. For example, each database 1710, 1720, 1730 can include one or more of the name of the horse, the horse's birthplace, or the horse's sire. The forces 1740, 1750, 1760 can be user-defined, and can specify the horse's name. For example, force 1740 can attract records having the name-value pair ("name," "Otis"), while force 1750 can attract records having the name-value pair ("name," "Samantha").

As described in this application, the forces 1740, 1750, 1760 can influence an information form including a combination of records. Consequently, the force 1760 can attract information forms having the name-value pair ("name," "Zug"), the name-value pair ("blood type," "AB"), and the name-value pair ("total mass," 10).

After multiple steps of the simulation, the result can be the equilibrium shown in FIG. 17, indicating that records contained in a single cluster 1770, 1780, 1790 and close to a force 1740, 1750, 1760 represent the same horse having the record value or values specified in the corresponding, closest force. The system 1700 can determine that the records contained in the cluster 1705 do not correspond to any of the forces 1740, 1750, 1760.

After determining that the records from disparate databases 1710, 1720, 1730 and contained in the cluster 1770, 1780, 1790 correspond to each other, the system 1700 can bind the records together to create a new information form. After the binding of the multiple records, to create the information form, the various forces described in this application can act on the information form including the bound records from multiple databases 1710, 1720, 1730.

Figure 18:
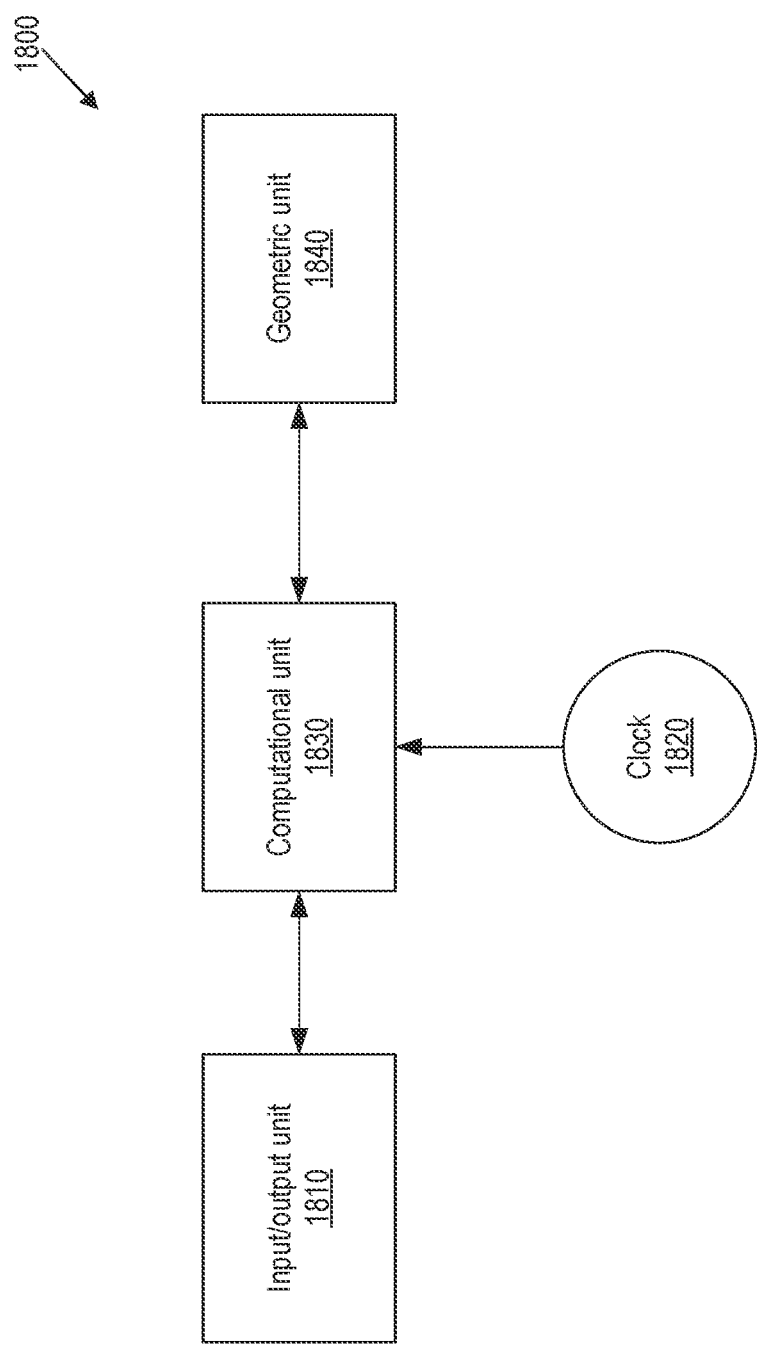
FIG. 18 shows a GIPS architecture.

FIG. 18 shows a GIPS architecture. As mentioned earlier, the new processor 1800 can be implemented in hardware, or can be implemented as a VM. The GIPS can include an input/output unit 1810, e.g., can be referred to as information input/output unit, a clock 1820, a computational unit 1830, and a geometric unit 1840. The input/output unit 1810 can be configured to obtain multiple records from one or more databases, where a record among the multiple records includes a name and a value. The name of the record can be "name"—identifying the name of the horse, "dam ID"—identifying the name of the mother, "sire ID"—identifying the name of the father, and "age"—identifying the age of the horse, while the values of the records can be "Rolo," "Chug," "Flower," and 5, respectively.

The clock 1820 can define a temporal step of computation by periodically sending a signal to the computational unit 1830 to initiate an operation. The computational unit 1830 can be configured to perform multiple operations during the step of computation. An operation among multiple operations can include a single force acting on an information form which can include one or more records among multiple records in the same database, or multiple records from multiple databases that have been bound together. The computational unit 1830 can determine multiple weights associated with the multiple records, where each record among the multiple records is associated with a weight among the multiple weights.

The computational unit can obtain a first force and a second force acting on the record among the multiple records, where the first force defines a first criterion to be satisfied by the record, and the second force defines a second criterion to be satisfied by the record. The first criterion includes a first value to be satisfied by the record. The first value can be a number or a string. The first criterion can include a first multiplicity of records, and a first multiplicity of values to be satisfied by the first multiplicity of records, where the first multiplicity of records includes multiple types, where the multiple types include a string type and a numerical type.

The intensity exerted by the first force on the record is based on the weight associated with the record and how closely the value associated with the record satisfies the first value associated with the first criterion. The second criterion is different from the first criterion and can be opposite of the first criterion. For example, if the first value is indicative of the maximum mass, e.g., weight, that a record can have, such as 20, the second criterion can indicate a value that indicates the minimum mass, e.g., 0.

The geometric unit 1840 can be configured to define a projection space based on the multiple records, where a first dimension in the projection space corresponds to the name associated with the record, and a second dimension in the projection space corresponds to the first force and the second force. The geometric unit 1840 can represent the record in the projection space by projecting the record into the projection space to obtain a projected record. The geometric unit 1840 can represent the first force and the second force in the projection space, where the first force is associated with a first position in the projection space, and the second force is associated with a second position in the projection space.

The computational unit 1830 can be configured to, during a single step of computation, in parallel perform multiple operations on multiple forces and multiple projected records as described below. The computational unit 1830 can apply the first force and the second force to the projected record, thereby changing a position of the projected record in the projection space, until an equilibrium between the first force and the second force is reached. The equilibrium can be reached when a change in the position of the projected record between subsequent application of the first force and the second force is below a predetermined threshold, such as below 5% of the distance between the first force and the second force in the projection space. Alternatively, the predetermined threshold, if there is only a single force, can correspond to less than 0.5 units and the second dimension representing the force in the projection space. The computational unit 1830 can determine how closely the value associated with the record satisfies the first value associated with the first criterion based on a distance between the projected record in the projection space at equilibrium and the first force.

To determine whether the value associated with the record satisfies the first value, the computational unit 1830 can determine whether the value is within a predetermined radius, such as two-unit radius, of the first force.

The input/output unit 1810 can obtain the multiple records from the database, where the name associated with the record corresponds to an identifier, and the value associated with the record corresponds to the value of the identifier. The computational unit 1830 can determine the multiple weights associated with the multiple records, where the weight has a first predetermined value such as 1 when the record has a value, and where the weight has a second predetermined value such as 0 when the record does not have a value. The computational unit 1830 can obtain the first force and the second force acting on the record among the multiple records, where the first criterion defines a desired identifier to be satisfied by the record, where the second criterion defines that the desired identifier is not satisfied by the record. The first force and the second force do not act on a record having the second predetermined value, such as 0. The computational unit can make a determination of how closely the value of the identifier satisfies the desired identifier associated with the first criterion based on a distance between the projected record in the projection space at equilibrium and the first force, where the determination is expressed on a predetermined scale. The predetermined scale can be 0 to 1, 0 to 100, or some other predetermined scale. The computational unit can make the determination as a value on the scale such as 0.9, 75, etc. The computational unit 1830 can make the determination binary such as if the measure of similarity is 50% or less, the value satisfies the first criterion, and if the measure of similarity is greater than 50%, the value satisfies the second criterion.

The input/output unit 1810 can obtain the multiple records from the database, where the name associated with the record corresponds to a gene, and the value associated with the record corresponds to a state of the gene including unknown, gene is not present, gene is present, or a gene carrier. The computational unit 1830 can obtain a first force and a second force acting on the record among the multiple records, where the first criterion defines that the gene is not present, and where the second criterion defines that the gene is present. The geometric unit 1840 can define a projection space based on the multiple records, where a first dimension in the projection space corresponds to the gene associated with the record, where a second dimension in the projection space corresponds to the first force and the second force. The computational unit 1830 can make a determination of how closely the state of the gene satisfies the first criterion based on a distance between the projected record in the projection space at equilibrium and the first force, where the determination is expressed on a predetermined scale.

The computational unit 1830 can express a correlation between a first multiplicity of records and a second multiplicity of records using the first force and the second force. The first multiplicity of records can come from a first database, where the second multiplicity of records can come from the second database. The first force can indicate a positive correlation of 1, and the second force indicates a negative correlation of −1. The computational unit 1830 can determine the correlation between the first multiplicity of records and the second multiplicity of records based on a distance between the first multiplicity of records, the second multiplicity of records, and the first force. In such a way, the first force can identify which records in multiple databases correspond to each other.

The computational unit 1830 can obtain a first multiplicity of records from a first database, and a second multiplicity of records from a second database, where a record in the first multiplicity of records has a value corresponding to a value of a record in the second multiplicity of records. For example, the records in the two databases can describe the same horse. The computational unit 1830 can obtain the first force having the first criterion defined to attract the record having the value. The computational unit 1830 can apply the first force to the first multiplicity of records and the second multiplicity of records until an equilibrium is achieved. The equilibrium can be achieved when the change between two steps of computation is below a predetermined threshold. Upon achieving the equilibrium, the computational unit 1830 can obtain a subset of records within a predetermined threshold of the first force, and determine that the subset of records within the predetermined threshold of the first force match, that is correspond to the same record, e.g. describe the same horse.

The computational unit 1830 can obtain the first force including a region of influence and determine whether the record is within the region of influence. Upon determining that the record is outside of the region of influence, the computational unit 1830 can determine that the first force does not influence the record. Upon determining that the record is within the region of influence, the computational unit 1830 can apply the first force to the record.

Flowchart

Figure 19:
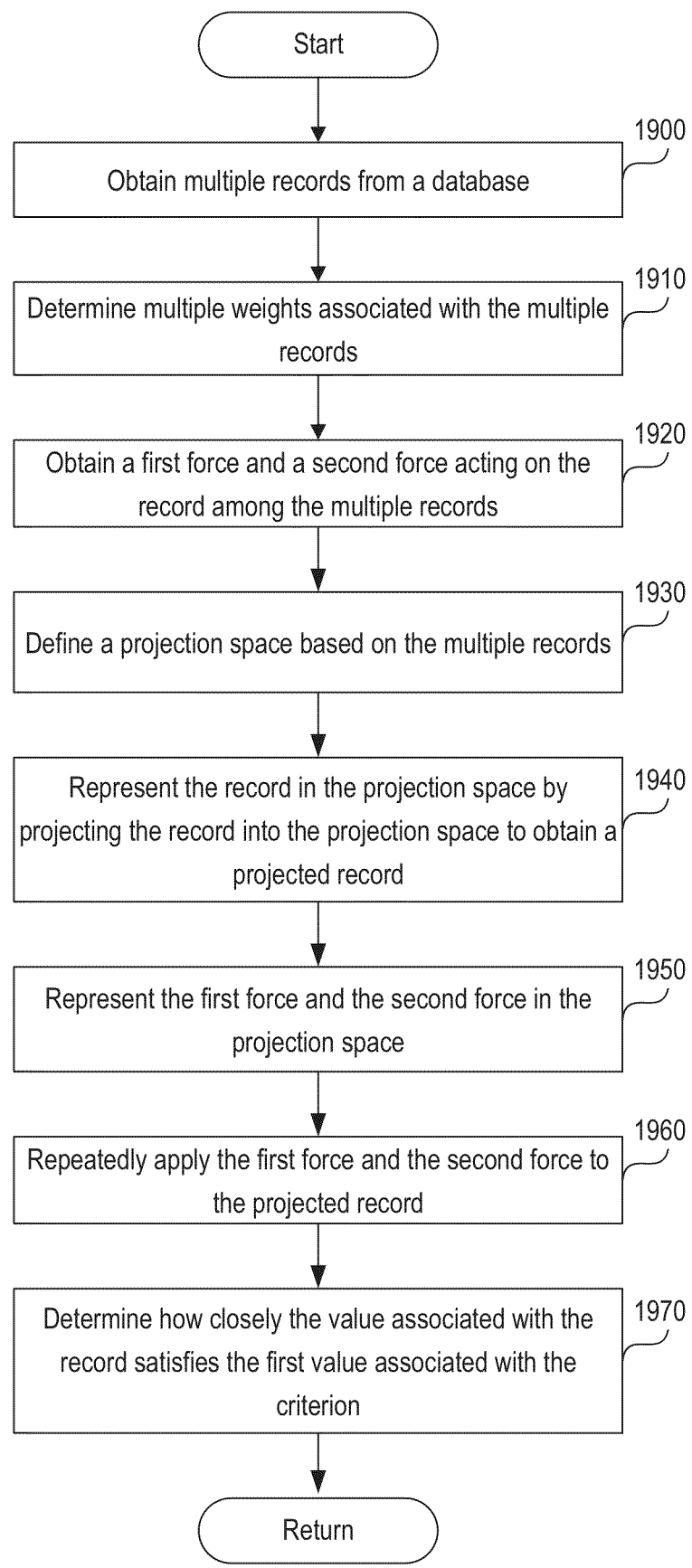
FIG. 19 is a flowchart of a method to analyze a database by representing database records in a projection space influenced by forces.

FIG. 19 is a flowchart of a method to analyze a database by representing database records in a projection space influenced by forces. In step 1900, a hardware or software processor executing instructions described in this application can obtain multiple records from a database, where a record among the multiple records includes a name and a value.

In step 1910, the processor can determine multiple weights associated with the multiple records, where each record among the multiple records is associated with a weight among the multiple weights. For example, a record can have a name, but can be missing a value because the value has not been entered in the database. Consequently, the processor can assign a weight of 1 to a record that has a name and a value, and a weight of 0 to a record that has a name but no value. A metric, as used in this application, can include the record having a name and value.

In step 1920, the processor can obtain a first force and optionally a second force acting on the record among the multiple records. The first force can define a first criterion to be satisfied by the record, where the first criterion includes a first value to be satisfied by the record. For example, the criterion can be that the value of the record "name" is "Astrachan," as described above. In another example, the first criterion can include a first multiplicity of records, and a first multiplicity of values to be satisfied by the first multiplicity of records, wherein the first multiplicity of records includes multiple types, wherein the multiple types include a string type and a numerical type.

An intensity exerted by the first force on the record is based on the weight associated with the record and how closely the value associated with the record satisfies the first value associated with the criterion. The intensity exerted by the first force can be based on equation (1) described in relation to FIGS. 12-13. The second force can define a second criterion to be satisfied by the record, where the second criterion is different from the first criterion, and can in fact be opposite from the first criterion.

In step 1930, the processor can define a projection space based on the multiple records. A first dimension in the projection space can correspond to the name associated with the record. The name associated with the record can be "identifier," "name," "sire," "birth date," etc., while the value associated with the record can be "938675," "Astrachan," "Hearse," "98-17-2011," etc., respectively. A second dimension in the projection space can correspond to the first force and the second force. For example, the first dimension can be the NFS gene, the ID of the sire, the owner, etc., while the second dimension can be a desired value of the first dimension, such as no NFS gene, the desired ID of the sire, the desired ID of the owner, etc.

In step 1940, the processor can represent the record in the projection space by projecting the record into the projection space to obtain a projected record. If a record doesn't have a value in a dimension, the value of the record can be 0. The projected record can be the InfoForm data projection in FIG. 3. The initial projections, as shown in FIG. 14, are made by disregarding the location of the forces.

In step 1950, the processor can represent the first force and the second force in the projection space, where the first force is associated with the first position in the projection space, and the second force is associated with the second position in the projection space, as shown in FIGS. 14-15.

In step 1960, the processor can repeatedly apply the first force and the second force to the projected record, thereby changing a position of the projected record in the projection space, until an equilibrium between the first force and the second force is reached. The equilibrium is reached when a change in the position of the projected record between subsequent application of the first force and the second force is below a predetermined threshold, such as 0.2 units of the projection space.

In step 1970, the processor can determine how closely the value associated with the record satisfies the first value associated with the criterion based on a distance between the projected record in the projection space at equilibrium and the first force.

The processor can obtain the multiple records from the database, where the name associated with the record corresponds to an identifier such as "name," and the value associated with the record corresponds to the value of the identifier, such as "Astrachan." The processor can determine the multiple weights associated with the multiple records, where the weight has a value of 1 when the record has a value, and where the weight has a value of 0 when the record does not have a value. The processor can obtain a first force and a second force acting on the record among the multiple records, where the first criterion defines the desired identifier to be satisfied by the record, and where the second criterion defines that the desired identifier is not satisfied by the record. The processor can define a projection space based on the multiple records, where a first dimension in the projection space is the identifier associated with the record, and a second dimension in the projection space corresponds to the first force and the second force. The processor can make a determination of how closely the value of the identifier satisfies the desired identifier associated with the criterion based on a distance between the projected record in the projection space at equilibrium and the first force, where the determination is expressed on a predetermined scale, such as 0-100, where 0 means no match, and 100 means a perfect match.

The processor can obtain the multiple records from the database, where the name associated with the record corresponds to a gene, and the value associated with the record corresponds to a state of the gene. The state of the gene can include unknown, gene is not present, gene is present, or a gene carrier. The processor can determine the multiple weights associated with the multiple records, where the weight has a value of 1 when the record has a value, and where the weight has a value of 0 when the record does not have a value. The processor can obtain a first force and a second force acting on the record among the multiple records, where the first criterion defines that the gene is not present, and the second criterion defines that the gene is present. The processor can define a projection space based on the multiple records, where a first dimension in the projection space corresponds to the gene associated with the record, and a second dimension in the projection space corresponds to the first force and the second force. The processor can make a determination of how closely the value of the identifier satisfies the desired identifier associated with the criterion based on a distance between the projected record in the projection space at equilibrium and the first force. The processor can express the determination on a predetermined scale, such as 0-100, where 0 means no match, and 100 means a perfect match.

The processor can express a correlation between the first multiplicity of records and a second multiplicity of records using the first force and the second force, where the first force indicates a perfect positive correlation, and the second force indicates a perfect negative correlation. Perfect positive correlation is a correlation of 1, while perfect negative correlation is a correlation of −1. The processor can determine the correlation between the first multiplicity of records and the second multiplicity of records based on a distance between the first multiplicity of records, the second multiplicity of records, and the first force. Based on the correlation, the processor can make decisions about causality. For example, perfect positive correlation or perfect negative correlation can indicate causality. Based on the correlation, the processor can make decisions such as to purchase the foal, to import a sperm of a sire, to buy a horse from a particular owner, etc. For example, if there is a higher correlation between the sire's descendants and the presence of the NFS gene, the processor can advise to not import the sperm. Similarly, if the foal's parents are known NFS gene carriers, the foal has a 25% chance of having the NFS gene, and the processor can advise to not buy the foal. Additionally, if there is a high correlation between the horse owner and horses that carry the NFS gene or have the NFS gene, the processor can advise to not purchase the horse from the particular owner.

The processor can obtain a first multiplicity of records from a first database, and the second multiplicity of records from a second database, where a record in the first multiplicity of records has a value corresponding to a value of a record in the second multiplicity of records, e.g., describing the same horse. The processor can obtain the first force having the first criterion defined to attract the record having the value. The processor can apply the first force to the first multiplicity of records and the second multiplicity of records until an equilibrium is achieved. Upon achieving the equilibrium, the processor can obtain a subset of records within a predetermined threshold of the first force. The processor can determine that the subset of records within the predetermined threshold of the first force match, that is correspond to the same record, e.g. describe the same horse.

The first force can include a region of influence. The processor can determine whether the record is within the region of influence. Upon determining that the record is outside of the region of influence, the processor can determine that the first force does not influence the record. Upon determining that the record is within the region of influence, the processor can apply the first force to the record.

Computer System

Figure 20:
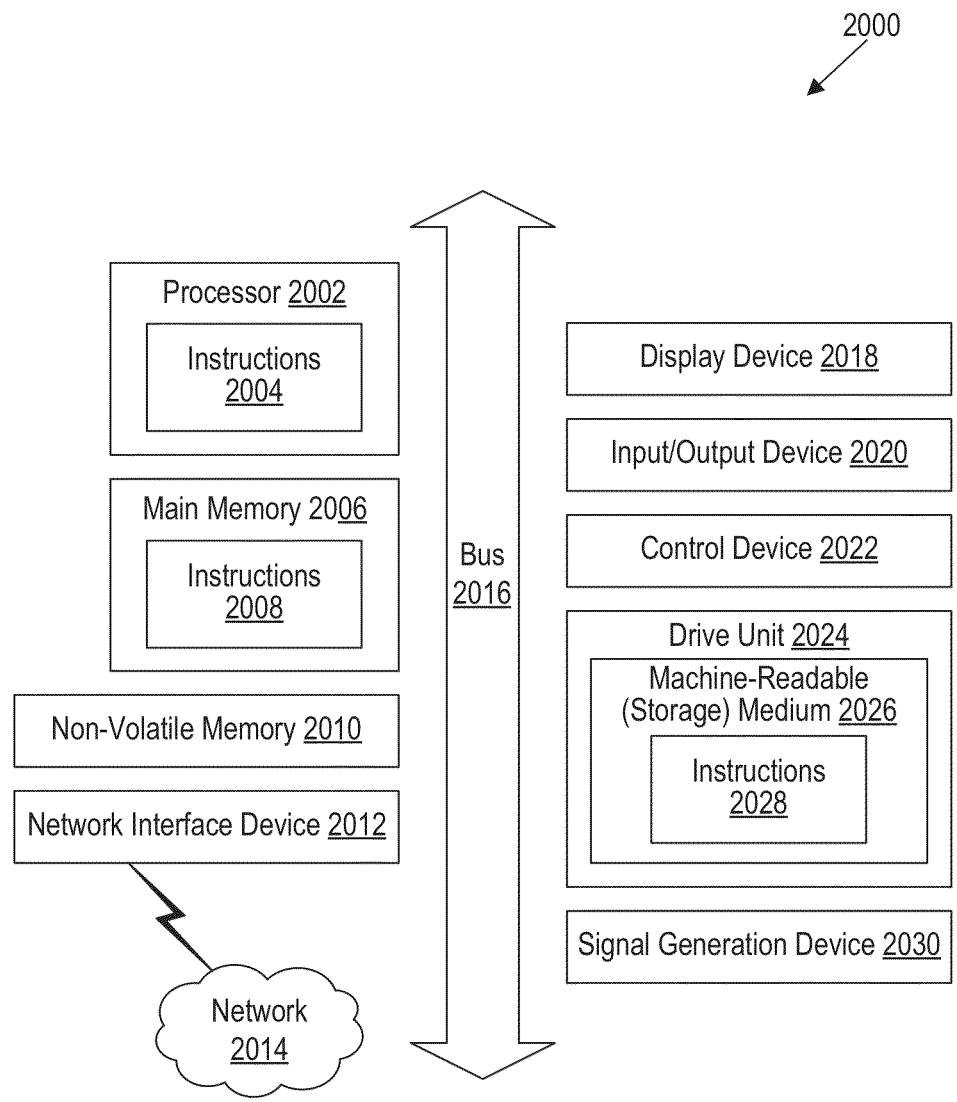
FIG. 20 is a block diagram that illustrates an example of a computer system in which at least some operations described herein can be implemented.

FIG. 20 is a block diagram that illustrates an example of a computer system 2000 in which at least some operations described herein can be implemented. As shown, the computer system 2000 can include: one or more processors 2002, main memory 2006, non-volatile memory 2010, a network interface device 2012, a video display device 2018, an input/output device 2020, a control device 2022 (e.g., keyboard and pointing device), a drive unit 2024 that includes a storage medium 2026, and a signal generation device 2030 that are communicatively connected to a bus 2016. The bus 2016 represents one or more physical buses and/or point-to-point connections that are connected by appropriate bridges, adapters, or controllers. Various common components (e.g., cache memory) are omitted from FIG. 20 for brevity. Instead, the computer system 2000 is intended to illustrate a hardware device on which components illustrated or described relative to the examples of the figures and any other components described in this specification can be implemented.

The computer system 2000 can act as a VM implementing the operations described in this application. The processor 2002 can correspond to the computational unit 1830 in FIG. 18 and the geometric unit 1840 in FIG. 18. The input/output unit 1810 in FIG. 18 can correspond to the input/output device 2020.

The computer system 2000 can take any suitable physical form. For example, the computing system 2000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 2000. In some implementations, the computer system 2000 can be an embedded computer system, a system-on-chip (SOC), a single-board computer system (SBC) or a distributed system such as a mesh of computer systems or include one or more cloud components in one or more networks. Where appropriate, one or more computer systems 2000 can perform operations in real time, near real time, or in batch mode.

The network interface device 2012 enables the computing system 2000 to mediate data in a network 2014 with an entity that is external to the computing system 2000 through any communication protocol supported by the computing system 2000 and the external entity. Examples of the network interface device 2012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2006, non-volatile memory 2010, machine-readable medium 2026) can be local, remote, or distributed. Although shown as a single medium, the machine-readable medium 2026 can include multiple media (e.g., a centralized/distributed database and/or associated caches and servers) that store one or more sets of instructions 2028. The machine-readable (storage) medium 2026 can include any medium that is capable of storing, encoding, or carrying a set of instructions for execution by the computing system 2000. The machine-readable medium 2026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 2010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2004, 2008, 2028) set at various times in various memory and storage devices in the computing device(s). When read and executed by the processor 2002, the instructions cause the computing system 2000 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
   an input/output unit configured to obtain multiple records from a database, wherein a record among the multiple records includes a name and a value;
   a clock defining a step of computation;
   a hardware processor configured to perform multiple operations during the step of computation wherein an operation among the multiple operations includes a single force acting on one or more records among the multiple records, the hardware processor configured to:
      determine multiple weights associated with the multiple records,
         wherein each record among the multiple records is associated with a weight among the multiple weights; and
      obtain a first force and a second force acting on the record among the multiple records,
         wherein the first force defines a first criterion to be satisfied by the record,
         wherein the first criterion includes a first value to be satisfied by the record,
         wherein an intensity exerted by the first force on the record is based on the weight associated with the record and how closely the value associated with the record satisfies the first value associated with the first criterion,
         wherein the second force defines a second criterion to be satisfied by the record,
         wherein the second criterion is different from the first criterion;
      define a projection space based on the multiple records,
         wherein a first dimension in the projection space corresponds to the name associated with the record,
         wherein a second dimension in the projection space corresponds to the first force and the second force;
      represent the record in the projection space by projecting the record into the projection space to obtain a projected record; and
      represent the first force and the second force in the projection space,
         wherein the first force is associated with a first position in the projection space, and the second force is associated with a second position in the projection space;
   the hardware processor configured to, during a single step of computation, in parallel perform multiple operations on multiple forces and multiple projected records including:
      apply the first force and the second force to the projected record, thereby changing a position of the projected record in the projection space, until an equilibrium between the first force and the second force is reached,
         wherein the equilibrium is reached when a change in the position of the projected record between subsequent application of the first force and the second force is below a predetermined threshold; and
      determine how closely the value associated with the record satisfies the first value associated with the first criterion based on a distance between the projected record in the projection space at equilibrium and the first force.

2. The system of claim 1, comprising:
   the input/output unit configured to obtain the multiple records from the database, wherein the name associated with the record corresponds to an identifier, and the value associated with the record corresponds to the value of the identifier; and
   the hardware processor configured to:
      determine the multiple weights associated with the multiple records,
         wherein the weight has a first predetermined value when the record has a value,
         wherein the weight has a second predetermined value when the record does not have a value;
      obtain the first force and the second force acting on the record among the multiple records,
         wherein the first criterion defines a desired identifier to be satisfied by the record,
         wherein the second criterion defines that the desired identifier is not satisfied by the record,
         wherein the first force and the second force do not act on a record having the second predetermined value; and
      make a determination of how closely the value of the identifier satisfies the desired identifier associated with the first criterion based on a distance between the projected record in the projection space at equilibrium and the first force,
         wherein the determination is expressed on a predetermined scale.

3. The system of claim 1, comprising:
   the input/output unit configured to obtain the multiple records from the database,
      wherein the name associated with the record corresponds to a gene, and the value associated with the record corresponds to a state of the gene,
      wherein the state of the gene includes unknown, the gene is not present, the gene is present, or a gene carrier;
   the hardware processor configured to obtain the first force and the second force acting on the record among the multiple records, wherein the first criterion defines that the gene is not present,
wherein the second criterion defines that the gene is present;
the hardware processor configured to define the projection space based on the multiple records,
wherein the first dimension in the projection space corresponds to the gene associated with the record,
wherein the second dimension in the projection space corresponds to the first force and the second force; and
the hardware processor configured to make a determination of how closely the state of the gene satisfies the first criterion based on a distance between the projected record in the projection space at equilibrium and the first force,
wherein the determination is expressed on a predetermined scale.

4. The system of claim 1, the hardware processor configured to:
express a correlation between a first multiplicity of records and a second multiplicity of records using the first force and the second force,
wherein the first force indicates a positive correlation, and the second force indicates a negative correlation; and
determine the correlation between the first multiplicity of records and the second multiplicity of records based on a distance between the first multiplicity of records, the second multiplicity of records, and the first force.

5. The system of claim 1, wherein the first criterion includes a first multiplicity of records, and a first multiplicity of values to be satisfied by the first multiplicity of records, wherein the first multiplicity of records includes multiple types, wherein the multiple types include a string type and a numerical type.

6. The system of claim 1, the hardware processor configured to:
obtain a first multiplicity of records from a first database, and a second multiplicity of records from a second database,
wherein a record in the first multiplicity of records has a value corresponding to a value of a record in the second multiplicity of records;
obtain the first force having the first criterion defined to attract the record having the value;
apply the first force to the first multiplicity of records and the second multiplicity of records until an equilibrium is achieved;
upon achieving the equilibrium, obtain a subset of records within a predetermined threshold of the first force; and
determine that the subset of records within the predetermined threshold of the first force match.

7. The system of claim 1, wherein the first force includes a region of influence, wherein the hardware processor is configured to:
determine whether the record is within the region of influence;
upon determining that the record is outside of the region of influence, determine that the first force does not influence the record; and
upon determining that the record is within the region of influence, apply the first force to the record.

8. A system comprising:
at least one hardware processor; and
at least one non-transitory memory storing instructions, which, when executed by the at least one hardware processor, cause the system to:
obtain multiple records from a database,
wherein a record among the multiple records includes a name and a value;
determine multiple weights associated with the multiple records,
wherein each record among the multiple records is associated with a weight among the multiple weights;
obtain a first force acting on the record among the multiple records,
wherein the first force defines a first criterion to be satisfied by the record,
wherein the first criterion includes a first value to be satisfied by the record,
wherein an intensity exerted by the first force on the record is based on the weight associated with the record and how closely the value associated with the record satisfies the first value associated with the first criterion;
define a projection space based on the multiple records,
wherein a first dimension in the projection space corresponds to the name associated with the record,
wherein a second dimension in the projection space corresponds to the first force;
represent the record in the projection space by projecting the record into the projection space to obtain a projected record;
represent the first force in the projection space,
wherein the first force is associated with a first position in the projection space;
repeatedly apply the first force to the projected record, thereby changing a position of the projected record in the projection space, until an equilibrium is reached,
wherein the equilibrium is reached when a change in the position of the projected record after subsequent application of the first force is below a predetermined threshold; and
determine how closely the value associated with the record satisfies the first value associated with the first criterion based on a distance between the projected record in the projection space at equilibrium and the first force.

9. The system of claim 8, comprising instructions to:
obtain the multiple records from the database,
wherein the name associated with the record corresponds to an identifier, and the value associated with the record corresponds to the value of the identifier;
determine the multiple weights associated with the multiple records,
wherein the weight has a first predetermined value when the record has a value,
wherein the weight has a second predetermined value when the record does not have a value;
obtain the first force acting on the record among the multiple records,
wherein the first force does not act on a record having the second predetermined value;
define the projection space based on the multiple records,
wherein the first dimension in the projection space is the identifier associated with the record,
wherein the second dimension in the projection space corresponds to the first force; and make a determination of how closely the value of the identifier satisfies the first criterion based on a distance between the projected record in the projection space at equilibrium and the first force,
    wherein the determination is expressed on a predetermined scale.

10. The system of claim 8, comprising instructions to:
obtain the multiple records from the database,
    wherein the name associated with the record corresponds to a gene, and the value associated with the record corresponds to a state of the gene,
    wherein the state of the gene includes unknown, gene is not present, gene is present, or a gene carrier;
obtain a first force and a second force acting on the record among the multiple records,
    wherein the first criterion defines that the gene is not present,
    wherein a second criterion associated with the second force defines that the gene is present;
define the projection space based on the multiple records,
    wherein the first dimension in the projection space corresponds to the gene associated with the record,
    wherein the second dimension in the projection space corresponds to the first force and the second force; and
make a determination of how closely the state of the gene satisfies the first criterion based on a distance between the projected record in the projection space at equilibrium and the first force,
    wherein the determination is expressed on a predetermined scale.

11. The system of claim 8, comprising instructions to:
express a correlation between a first multiplicity of records and a second multiplicity of records using the first force and a second force,
    wherein the first force indicates a positive correlation, and the second force indicates a negative correlation; and
determine the correlation between the first multiplicity of records and the second multiplicity of records based on a distance between the first multiplicity of records, the second multiplicity of records, and the first force.

12. The system of claim 8, wherein the first criterion includes a first multiplicity of records, and a first multiplicity of values to be satisfied by the first multiplicity of records, wherein the first multiplicity of records includes multiple types, wherein the multiple types include a string type and a numerical type.

13. The system of claim 8, comprising instructions to:
obtain a first multiplicity of records from a first database, and a second multiplicity of records from a second database,
    wherein a record in the first multiplicity of records has a value corresponding to a value of a record in the second multiplicity of records;
obtain the first force having the first criterion defined to attract the record having the value;
apply the first force to the first multiplicity of records and the second multiplicity of records until an equilibrium is achieved;
upon achieving the equilibrium, obtain a subset of records within a predetermined threshold of the first force; and
determine that the subset of records within the predetermined threshold of the first force match.

14. A non-transitory, computer-readable storage medium comprising instructions recorded thereon, wherein the instructions, when executed by at least one data processor of a system, cause the system to:
obtain multiple records from a database,
    wherein a record among the multiple records includes a name and a value;
determine multiple weights associated with the multiple records,
    wherein each record among the multiple records is associated with a weight among the multiple weights;
obtain a first force acting on the record among the multiple records,
    wherein the first force defines a first criterion to be satisfied by the record,
    wherein the first criterion includes a first value to be satisfied by the record,
    wherein an intensity exerted by the first force on the record is based on the weight associated with the record and how closely the value associated with the record satisfies the first value associated with the first criterion;
define a projection space based on the multiple records,
    wherein a first dimension in the projection space corresponds to the name associated with the record,
    wherein a second dimension in the projection space corresponds to the first force;
represent the record in the projection space by projecting the record into the projection space to obtain a projected record;
represent the first force in the projection space,
    wherein the first force is associated with a first position in the projection space;
repeatedly apply the first force to the projected record, thereby changing a position of the projected record in the projection space, until an equilibrium is reached,
    wherein the equilibrium is reached when a change in the position of the projected record after subsequent application of the first force is below a predetermined threshold; and
determine how closely the value associated with the record satisfies the first value associated with the first criterion based on a distance between the projected record in the projection space at equilibrium and the first force.

15. The non-transitory, computer-readable storage medium of claim 14, comprising instructions to:
obtain the multiple records from the database,
    wherein the name associated with the record corresponds to an identifier, and the value associated with the record corresponds to the value of the identifier;
determine the multiple weights associated with the multiple records,
    wherein the weight has a first predetermined value when the record has a value,
    wherein the weight has a second predetermined value when the record does not have a value;
obtain the first force acting on the record among the multiple records,
    wherein the first criterion defines a desired identifier to be satisfied by the record,
    wherein the first force does not act on a record having the second predetermined value;
define the projection space based on the multiple records,
    wherein the first dimension in the projection space is the identifier associated with the record,
    wherein the second dimension in the projection space corresponds to the first force; and make a determination of how closely the value of the identifier satisfies the desired identifier associated with the first criterion based on a distance between the projected record in the projection space at equilibrium and the first force,
wherein the determination is expressed on a predetermined scale.

16. The non-transitory, computer-readable storage medium of claim 14, comprising instructions to:
obtain the multiple records from the database,
wherein the name associated with the record corresponds to a gene, and the value associated with the record corresponds to a state of the gene,
wherein the state of the gene includes unknown, the gene is not present, the gene is present, or a gene carrier;
obtain a first force and a second force acting on the record among the multiple records,
wherein the first criterion defines that the gene is not present,
wherein a second criterion associated with the second force defines that the gene is present;
define the projection space based on the multiple records,
wherein the first dimension in the projection space corresponds to the gene associated with the record,
wherein the second dimension in the projection space corresponds to the first force and the second force; and
make a determination of how closely the state of the gene satisfies the first criterion based on a distance between the projected record in the projection space at equilibrium and the first force,
wherein the determination is expressed on a predetermined scale.

17. The non-transitory, computer-readable storage medium of claim 14, comprising instructions to:
express a correlation between a first multiplicity of records and a second multiplicity of records using the first force and a second force,
wherein the first force indicates a positive correlation, and the second force indicates a negative correlation; and
determine the correlation between the first multiplicity of records and the second multiplicity of records based on a distance between the first multiplicity of records, the second multiplicity of records, and the first force.

18. The non-transitory, computer-readable storage medium of claim 14, wherein the first criterion includes a first multiplicity of records, and a first multiplicity of values to be satisfied by the first multiplicity of records, wherein the first multiplicity of records includes multiple types, wherein the multiple types include a string type and a numerical type.

19. The non-transitory, computer-readable storage medium of claim 14, comprising instructions to:
obtain a first multiplicity of records from a first database, and a second multiplicity of records from a second database,
wherein a record in the first multiplicity of records has a value corresponding to a value of a record in the second multiplicity of records;
obtain the first force having the first criterion defined to attract the record having the value;
apply the first force to the first multiplicity of records and the second multiplicity of records until an equilibrium is achieved;
upon achieving the equilibrium, obtain a subset of records within a predetermined threshold of the first force; and
determine that the subset of records within the predetermined threshold of the first force match.

20. The non-transitory, computer-readable storage medium of claim 14, wherein the first force includes a region of influence, comprising instructions to:
determine whether the record is within the region of influence;
upon determining that the record is outside of the region of influence, determine that the first force does not influence the record; and
upon determining that the record is within the region of influence, apply the first force to the record.

* * * * *